(12) United States Patent
Lim

(10) Patent No.: US 12,542,911 B2
(45) Date of Patent: Feb. 3, 2026

(54) VIDEO SIGNAL ENCODING/DECODING METHOD BASED ON INTRA PREDICTION IN SUB-BLOCK UNITS, AND RECORDING MEDIUM FOR STORING BIT-STREAM

(71) Applicant: KT CORPORATION, Gyeonggi-do (KR)

(72) Inventor: Sung Won Lim, Gyeonggi-do (KR)

(73) Assignee: KT CORPORATION, Gyeonggi-do (KR)

( * ) Notice: Subject to any disclaimer, the term of this patent is extended or adjusted under 35 U.S.C. 154(b) by 41 days.

(21) Appl. No.: 18/569,775

(22) PCT Filed: Jun. 28, 2022

(86) PCT No.: PCT/KR2022/009245
§ 371 (c)(1),
(2) Date: Dec. 13, 2023

(87) PCT Pub. No.: WO2023/277538
PCT Pub. Date: Jan. 5, 2023

(65) Prior Publication Data
US 2024/0373035 A1 Nov. 7, 2024

(30) Foreign Application Priority Data
Jun. 29, 2021 (KR) .................. 10-2021-0085115

(51) Int. Cl.
*H04N 19/159* (2014.01)
*H04N 19/119* (2014.01)
*H04N 19/176* (2014.01)

(52) U.S. Cl.
CPC ......... *H04N 19/159* (2014.11); *H04N 19/119* (2014.11); *H04N 19/176* (2014.11)

(58) Field of Classification Search
CPC .. H04N 19/159; H04N 19/119; H04N 19/176; H04N 19/11; H04N 19/593; H04N 19/105; H04N 19/70; H04N 19/96
See application file for complete search history.

(56) References Cited

U.S. PATENT DOCUMENTS

2010/0054616 A1\* 3/2010 Kim .................. H04N 19/176
382/233
2019/0215512 A1 7/2019 Lee et al.
(Continued)

FOREIGN PATENT DOCUMENTS

KR 10-2018-0005121 A 1/2018
KR 10-2018-0037575 A 4/2018
(Continued)

OTHER PUBLICATIONS

Korean Intellectual Property Office, International Search Report of International Application No. PCT/KR2022/009245, Sep. 29, 2022.
(Continued)

*Primary Examiner* — Nam D Pham
(74) *Attorney, Agent, or Firm* — IP Legal Services, LLC

(57) ABSTRACT

A video encoding/decoding method according to the present disclosure may comprise the steps of: inducing a reference mode of respective neighboring blocks within a current block; and performing, on the basis of at least one of reference modes, intra prediction on a sub-block, in the current block, that is smaller than the current block.

9 Claims, 32 Drawing Sheets

16x16 Block

(56) References Cited

U.S. PATENT DOCUMENTS

| | | |
|---|---|---|
| 2019/0246133 A1 | 8/2019 | Lee |
| 2020/0021804 A1 | 1/2020 | Jun et al. |
| 2021/0168362 A1 | 6/2021 | Jun et al. |
| 2022/0070446 A1 | 3/2022 | Lee et al. |
| 2022/0174272 A1 | 6/2022 | Choi et al. |
| 2022/0248026 A1* | 8/2022 | Lee ................ H04N 19/119 |
| 2023/0119780 A1 | 4/2023 | Choi et al. |
| 2023/0239466 A1 | 7/2023 | Lee et al. |
| 2023/0362355 A1 | 11/2023 | Lee et al. |
| 2023/0370581 A1 | 11/2023 | Lee et al. |
| 2023/0370582 A1 | 11/2023 | Lee et al. |

FOREIGN PATENT DOCUMENTS

| | | |
|---|---|---|
| KR | 10-2018-0041833 A | 4/2018 |
| WO | 2018/066863 A1 | 4/2018 |
| WO | 2020/251330 A1 | 12/2020 |

OTHER PUBLICATIONS

Korean Intellectual Property Office, Written Opinion of International Application No. PCT/KR2022/009245, Sep. 29, 2022.

* cited by examiner

FIG. 10

| Index | 0 | 1 | 2 | 3 |
|---|---|---|---|---|
| QT_HOR | Block / Block / Block / Block | Block / Block / Block / Block | Block / Block / Block / Block | Block / Block / Block / Block |
| QT_VER | Block / Block / Block / Block | Block / Block / Block / Block | Block / Block / Block / Block | Block / Block / Block / Block |

| 1 | 2 |
|---|---|
| 3 | 4 |

| 1 | 3 |
|---|---|
| 2 | 4 |

| 2 | 1 |
|---|---|
| 4 | 3 |

| 3 | 1 |
|---|---|
| 4 | 2 |

| 3 | 4 |
|---|---|
| 1 | 2 |

| 2 | 4 |
|---|---|
| 1 | 3 |

| 4 | 3 |
|---|---|
| 2 | 1 |

| 4 | 2 |
|---|---|
| 3 | 1 |

Horizontal direction | Vertical direction

FIG. 23

| a | b | c | d | A | e |
|---|---|---|---|---|---|
| p |   |   |   | RT | R |
| o |   |   |   |   | f |
| n |   |   |   |   | g |
| L | LB |  |   |   | h |
| m | B | l | k | j | i |

(a)

(b)

(a)

(b)

16x16 Block

16x16 Block

16x16 Block
(a)

16x16
Block
(b)

(a)　　　(b)

----▷ Weighted sum mode

FIG. 39

| DCT | DST | DST | DST |
| DST | DST | Transform Skip | DCT |
| DCT | DST | DCT | Transform Skip |
| DCT | DST | DST | DST |

VIDEO SIGNAL ENCODING/DECODING METHOD BASED ON INTRA PREDICTION IN SUB-BLOCK UNITS, AND RECORDING MEDIUM FOR STORING BIT-STREAM

CROSS REFERENCE TO RELATED APPLICATIONS

This application is a National Stage Patent Application of PCT International Patent Application No. PCT/KR2022/009245 (filed on Jun. 28, 2022) under 35 U.S.C. § 371, which claims priority to Korean Patent Application No. 10-2021-0085115 (filed on Jun. 29, 2021), the teachings of which are incorporated herein in their entireties by reference.

TECHNICAL FIELD

The present disclosure relates to a method and a device for processing a video signal.

BACKGROUND ART

Recently, demands for high-resolution and high-quality images such as HD (High Definition) images and UHD (Ultra High Definition) images have increased in a variety of application fields. As image data becomes high-resolution and high-quality, the volume of data relatively increases compared to the existing image data, so when image data is transmitted by using media such as the existing wire and wireless broadband circuit or is stored by using the existing storage medium, expenses for transmission and expenses for storage increase. High efficiency image compression technologies may be utilized to resolve these problems which are generated as image data becomes high-resolution and high-quality.

There are various technologies such as an inter prediction technology which predicts a pixel value included in a current picture from a previous or subsequent picture of a current picture with an image impression technology, an intra prediction technology which predicts a pixel value included in a current picture by using pixel information in a current picture, an entropy encoding technology which assigns a short sign to a value with high appearance frequency and assigns a long sign to a value with low appearance frequency and so on, and image data may be effectively compressed and transmitted or stored by using these image compression technologies.

On the other hand, as demands for a high-resolution image have increased, demands for stereo-scopic image contents have increased as a new image service. A video compression technology for effectively providing high-resolution and ultra high-resolution stereo-scopic image contents has been discussed.

DISCLOSURE

Technical Problem

The present disclosure intends to provide a block partition method and device in a tree structure.

The present disclosure intends to provide a method and a device for deriving an intra prediction mode for intra prediction.

The present disclosure intends to provide a method and a device for deriving an extended reference pixel for intra prediction.

The present disclosure intends to provide a method and a device for performing intra prediction in a unit of a sub-block.

The present disclosure intends to provide a method and a device for storing only an intra prediction mode of a representative block among sub-blocks.

The present disclosure intends to provide a method and a device for generating a prediction block based on one or more intra prediction modes.

Technical effects of the present disclosure may be non-limited by the above-mentioned technical effects, and other unmentioned technical effects may be clearly understood from the following description by those having ordinary skill in the technical field to which the present disclosure pertains.

Technical Solution

An image decoding method according to the present disclosure includes deriving a reference mode of each neighboring block in a current block and based on at least one of reference modes, performing intra prediction for a sub-block having a smaller size than the current block in the current block.

An image encoding method according to the present disclosure includes deriving a reference mode of each neighboring block in a current block and based on at least one of reference modes, performing intra prediction for a sub-block having a smaller size than the current block in the current block.

In an image decoding method according to the present disclosure, the intra prediction of the sub-block may be performed based on an intra prediction mode derived based on the at least one reference mode.

In an image decoding method according to the present disclosure, the intra prediction mode may be derived by a weighted sum operation between a first reference mode and a second reference mode selected among the reference modes.

In an image decoding method according to the present disclosure, the first reference mode may be an intra prediction mode of a top neighboring block belonging to the same column as the sub-block and the second reference mode may be an intra prediction mode of a left neighboring block belonging to the same row as the sub-block.

In an image decoding method according to the present disclosure, in the weighted sum operation, a first weight applied to the first reference mode and a second weight applied to the second reference mode may be determined based on a distance between the sub-block and the top neighboring block and a distance between the sub-block and the left neighboring block.

In an image decoding method according to the present disclosure, the reference mode may be derived based on an intra prediction mode of a neighboring block and when the neighboring block is not encoded by intra prediction, the reference mode may be derived based on an intra prediction mode of at least one block adjacent to the neighboring block.

In an image decoding method according to the present disclosure, when the neighboring block is not encoded by intra prediction, an average value, the minimum value or the maximum value of intra prediction modes of blocks positioned on both sides of the neighboring block may be configured as the reference mode.

In an image decoding method according to the present disclosure, based on a first prediction block generated through first intra prediction based on a first reference mode selected among the reference modes and a second prediction block generated through second intra prediction based on a second reference mode selected among the reference modes, a third prediction block for the sub-block may be generated.

In an image decoding method according to the present disclosure, the third prediction block may be obtained based on a weighted sum operation between the first prediction block and the second prediction block.

In an image decoding method according to the present disclosure, in the weighted sum operation, a first weight applied to the first prediction block and a second weight applied to the second prediction block may be determined based on a distance between the sub-block and the top neighboring block and a distance between the sub-block and the left neighboring block.

In an image decoding method according to the present disclosure, when intra prediction is performed for the sub-block having a smaller size than the current block, the sub-block may be configured as a unit for performing an inverse transform.

In an image decoding method according to the present disclosure, the inverse transform may be performed based on a transform kernel determined based on an intra prediction mode of the sub-block.

In an image decoding method according to the present disclosure, when intra prediction is performed for the sub-block having a smaller size than the current block, whether the sub-block will be configured as a unit for performing an inverse transform may be selectively determined.

A computer readable recording medium according to the present disclosure may store a bitstream generated by an image encoding method described above or decoded by an image decoding method.

Features briefly summarized above with respect to the present disclosure are just an exemplary aspect of a detailed description of the present disclosure described below, and they do not limit a scope of the present disclosure.

Technical Effect

According to the present disclosure, a size and a shape of a coding block, a prediction block or a transform block may be effectively determined through block partition in various tree structures.

According to the present disclosure, encoding efficiency of intra prediction may be improved by using an extended MPM candidate and a reference pixel as a basis.

According to the present disclosure, encoding efficiency may be improved through intra prediction in a unit of a sub-block.

According to the present disclosure, a bandwidth for storing data may be reduced by storing only an intra prediction mode of a representative block among sub-blocks.

Effects obtainable from the present disclosure are not limited to the above-mentioned effects and other unmentioned effects may be clearly understood from the following description by those having ordinary skill in the technical field to which the present disclosure pertains.

BRIEF DESCRIPTION OF DRAWINGS

FIGS. 3 to 12 show a block partition method according to the present disclosure.

FIGS. 13 to 17 show encoding order according to a block partition method according to the present disclosure.

As an embodiment to which the present disclosure is applied.

As an embodiment to which the present disclosure is applied, FIG. 21 shows a scope of an intra prediction mode which may be used by a partition in a current block.

As an embodiment to which the present disclosure is applied, FIGS. 22 and 23 show a surrounding reference position used when configuring a MPM list.

As an embodiment to which the present disclosure is applied.

FIG. 39 shows an example in which whether to skip transform and a transform kernel are determined per sub-block.

DETAILED DESCRIPTION OF THE DISCLOSURE

Figure 1:
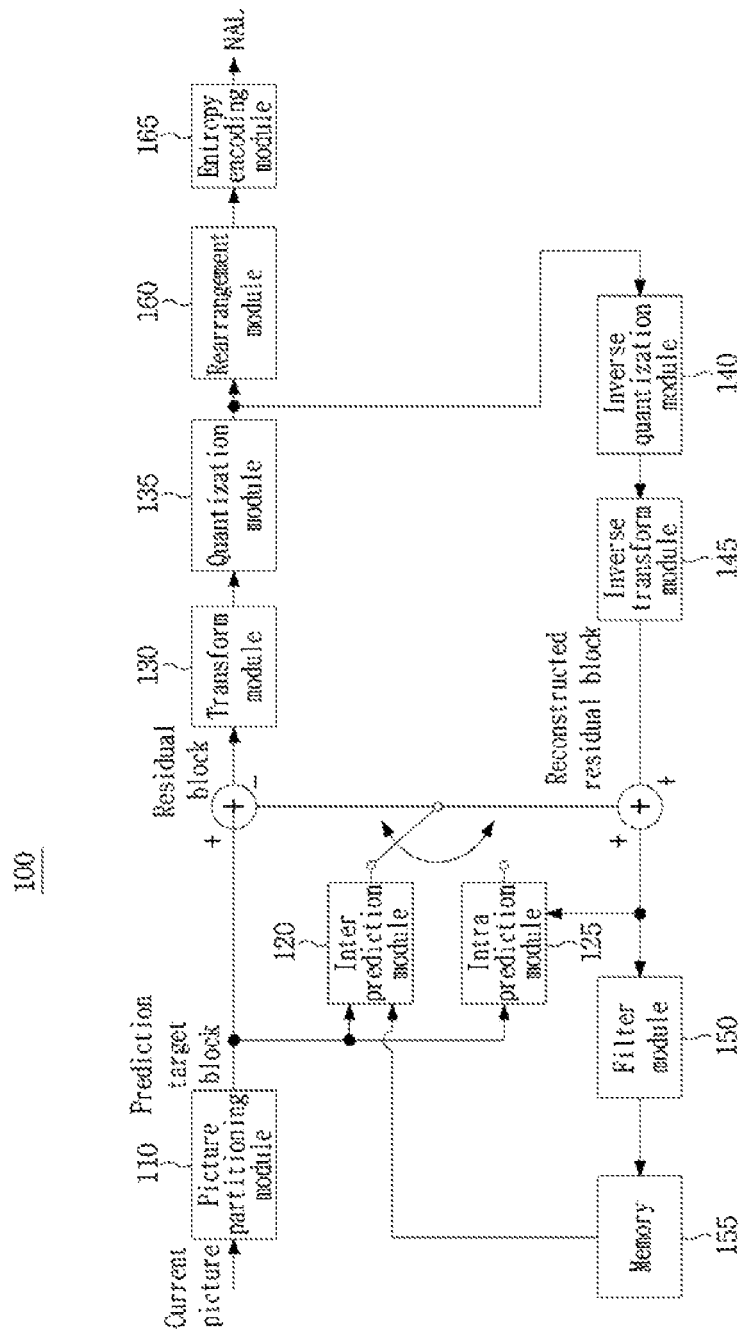
FIG. 1 is a block diagram showing an image encoding device according to an embodiment of the present disclosure.

As the present disclosure may make various changes and have several embodiments, specific embodiments will be illustrated in a drawing and described in detail. But, it is not intended to limit the present disclosure to a specific embodiment, and it should be understood that it includes all changes, equivalents or substitutes included in an idea and a technical scope for the present disclosure. A similar reference numeral was used for a similar component while describing each drawing.

A term such as first, second, etc. may be used to describe various components, but the components should not be limited by the terms. The terms are used only to distinguish one component from other components. For example, without going beyond a scope of a right of the present disclosure, a first component may be referred to as a second component and similarly, a second component may be also referred to as a first component. A term of and/or includes a combination of a plurality of relative entered items or any item of a plurality of relative entered items.

When a component is referred to as being "linked" or "connected" to other component, it should be understood that it may be directly linked or connected to that other component, but other component may exist in the middle. On the other hand, when a component is referred to as being "directly linked" or "directly connected" to other component, it should be understood that other component does not exist in the middle.

As terms used in this application are just used to describe a specific embodiment, they are not intended to limit the present disclosure. Expression of the singular includes expression of the plural unless it clearly has a different meaning contextually. In this application, it should be understood that a term such as "include" or "have", etc. is to designate the existence of characteristics, numbers, steps, motions, components, parts or their combinations entered in the specification, but is not to exclude a possibility of addition or existence of one or more other characteristics, numbers, steps, motions, components, parts or their combinations in advance.

Hereinafter, referring to the attached drawings, a desirable embodiment of the present disclosure will be described in more detail. Hereinafter, the same reference numeral is used for the same component in a drawing and an overlapping description for the same component is omitted.

FIG. 1 is a block diagram showing an image encoding device according to an embodiment of the present disclosure.

Referring to FIG. 1, an image encoding device 100 may include a picture partitioning unit 110, prediction units 120 and 125, a transform unit 130, a quantization unit 135, a rearrangement unit 160, an entropy encoding unit 165, a dequantization unit 140, an inverse-transform unit 145, a filter unit 150, and a memory 155.

As each construction unit shown in FIG. 1 is independently shown to represent different characteristic functions in an image encoding device, it does not mean that each construction unit is constituted by separated hardware or one software unit. That is, as each construction unit is included by being enumerated as each construction unit for convenience of a description, at least two construction units of each construction unit may be combined to constitute one construction unit or one construction unit may be partitioned into a plurality of construction units to perform a function, and even an integrated embodiment and a separated embodiment of each construction unit are also included in a scope of a right of the present disclosure unless they are departing from the essence of the present disclosure.

Further, some components may be just an optional component for improving performance, not a necessary component which perform an essential function in the present disclosure. The present disclosure may be implemented by including only a construction unit necessary for implementing the essence of the present disclosure excluding a component used to just improve performance, and a structure including only a necessary component excluding an optional component used to just improve performance is also included in a scope of a right of the present disclosure.

A picture partitioning unit 110 may partition an input picture into at least one processing unit. In this case, a processing unit may be a prediction unit (PU), a transform unit (TU) or a coding unit (CU). In a picture partitioning unit 110, one picture may be partitioned into a combination of a plurality of coding units, prediction units and transform units and a picture may be encoded by selecting a combination of one coding unit, prediction unit and transform unit according to a predetermined standard (e.g., a cost function).

For example, one picture may be partitioned into a plurality of coding units. In order to partition a coding unit in a picture, a recursive tree structure such as a quad tree, a ternary tree or a binary tree may be used, and a coding unit which is partitioned into other coding units by using one image or the largest coding unit as a route may be partitioned with as many child nodes as the number of partitioned coding units. A coding unit which is no longer partitioned according to a certain restriction becomes a leaf node. In an example, when it is assumed that quad tree partitioning is applied to one coding unit, one coding unit may be partitioned into up to four other coding units.

Hereinafter, in an embodiment of the present disclosure, a coding unit may be used as a unit for encoding or may be used as a unit for decoding.

A prediction unit may be partitioned with at least one square or rectangular shape, etc. in the same size in one coding unit or may be partitioned so that any one prediction unit of prediction units partitioned in one coding unit can have a shape and/or a size different from another prediction unit.

In intra prediction, a transform unit may be configured to be the same as a prediction unit. In this case, after partitioning a coding unit into a plurality of transform units, intra prediction may be performed per each transform unit. A coding unit may be partitioned in a horizontal direction or in a vertical direction. The number of transform units generated by partitioning a coding unit may be 2 or 4 according to a size of a coding unit.

Prediction units 120 and 125 may include an inter prediction unit 120 performing inter prediction and an intra prediction unit 125 performing intra prediction. Whether to perform inter prediction or intra prediction for a coding unit may be determined and detailed information according to each prediction method (e.g., an intra prediction mode, a motion vector, a reference picture, etc.) may be determined. In this case, a processing unit that prediction is performed may be different from a processing unit that a prediction method and details are determined. For example, a prediction method, a prediction mode, etc. may be determined in a coding unit and prediction may be performed in a prediction unit or a transform unit. A residual value (a residual block) between a generated prediction block and an original block may be input to a transform unit 130. In addition, prediction mode information, motion vector information, etc. used for prediction may be encoded with a residual value in an entropy encoding unit 165 and may be transmitted to a decoding device. When a specific encoding mode is used, an original block may be encoded as it is and transmitted to a decoding unit without generating a prediction block through prediction units 120 or 125.

An inter prediction unit 120 may predict a prediction unit based on information on at least one picture of a previous picture or a subsequent picture of a current picture, or in some cases, may predict a prediction unit based on information on some encoded regions in a current picture. An inter prediction unit 120 may include a reference picture interpolation unit, a motion prediction unit and a motion compensation unit.

A reference picture interpolation unit may receive reference picture information from a memory 155 and generate pixel information equal to or less than an integer pixel in a reference picture. For a luma pixel, a 8-tap DCT-based interpolation filter having a different filter coefficient may be used to generate pixel information equal to or less than an integer pixel in a ¼ pixel unit. For a chroma signal, a 4-tap DCT-based interpolation filter having a different filter coefficient may be used to generate pixel information equal to or less than an integer pixel in a ⅛ pixel unit.

A motion prediction unit may perform motion prediction based on a reference picture interpolated by a reference picture interpolation unit. As a method for calculating a motion vector, various methods such as FBMA (Full search-based Block Matching Algorithm), TSS (Three Step Search), NTS (New Three-Step Search Algorithm), etc. may be used. A motion vector may have a motion vector value in a ½ or ¼ pixel unit based on an interpolated pixel. A motion prediction unit may predict a current prediction unit by varying a motion prediction method. As a motion prediction method, various methods such as a skip method, a merge method, an advanced motion vector prediction (AMVP) method, an intra block copy method, etc. may be used.

An intra prediction unit 125 may generate a prediction unit based on reference pixel information which is pixel information in a current picture. Reference pixel information may be derived from selected one of a plurality of reference pixel lines. A N-th reference pixel line among a plurality of reference pixel lines may include left pixels whose x-axis difference with a top-left pixel in a current block is N and top pixels whose y-axis difference with the top-left pixel is N. The number of reference pixel lines which may be selected by a current block may be 1, 2, 3 or 4.

When a neighboring block in a current prediction unit is a block which performed inter prediction and accordingly, a reference pixel is a pixel which performed inter prediction, a reference pixel included in a block which performed inter prediction may be used by being replaced with reference pixel information of a surrounding block which performed intra prediction. In other words, when a reference pixel is unavailable, unavailable reference pixel information may be used by being replaced with at least information of available reference pixels.

A prediction mode in intra prediction may have a directional prediction mode using reference pixel information according to a prediction direction and a non-directional mode not using directional information when performing prediction. A mode for predicting luma information may be different from a mode for predicting chroma information and intra prediction mode information used for predicting luma information or predicted luma signal information may be utilized to predict chroma information.

When a size of a prediction unit is the same as that of a transform unit in performing intra prediction, intra prediction for a prediction unit may be performed based on a pixel at a left position of a prediction unit, a pixel at a top-left position and a pixel at a top position.

An intra prediction method may generate a prediction block after applying a smoothing filter to a reference pixel according to a prediction mode. According to a selected reference pixel line, whether a smoothing filter is applied may be determined.

In order to perform an intra prediction method, an intra prediction mode in a current prediction unit may be predicted from an intra prediction mode in a prediction unit around a current prediction unit. When a prediction mode in a current prediction unit is predicted by using mode information predicted from a surrounding prediction unit, information that a prediction mode in a current prediction unit is the same as a prediction mode in a surrounding prediction unit may be transmitted by using predetermined flag information if an intra prediction mode in a current prediction unit is the same as an intra prediction mode in a surrounding prediction unit, and prediction mode information of a current block may be encoded by performing entropy encoding if a prediction mode in a current prediction unit is different from a prediction mode in a surrounding prediction unit.

In addition, a residual block may be generated which includes information on a residual value that is a difference value between a prediction unit which performed prediction based on a prediction unit generated in prediction units 120 and 125 and an original block in a prediction unit. A generated residual block may be input to a transform unit 130.

A transform unit 130 may transform an original block and a residual block including residual value information in a prediction unit generated through prediction units 120 and 125 by using a transform method such as DCT (Discrete Cosine Transform), DST (Discrete Sine Transform), KLT. Whether to apply DCT, DST or KLT to transform a residual block may be determined based on at least one of a size of a transform unit, a form of a transform unit, a prediction mode in a prediction unit or intra prediction mode information in a prediction unit.

A quantization unit 135 may quantize values transformed into a frequency domain in a transform unit 130. A quantization coefficient may be changed according to a block or importance of an image. A value calculated in a quantization unit 135 may be provided to a dequantization unit 140 and a rearrangement unit 160.

A rearrangement unit 160 may perform rearrangement of a coefficient value for a quantized residual value.

A rearrangement unit 160 may change a coefficient in a shape of a two-dimensional block into a shape of a one-dimensional vector through a coefficient scan method. For example, a rearrangement unit 160 may scan a DC coefficient to a coefficient in a high-frequency domain by using a zig-zag scan method and change it into a shape of a one-dimensional vector. According to a size of a transform unit and an intra prediction mode, instead of zig-zag scan, vertical scan where a coefficient in a shape of a two-dimensional block is scanned in a column direction, horizontal scan where a coefficient in a shape of a two-dimensional block is scanned in a row direction or diagonal scan where a coefficient in a shape of a two-dimensional block is scanned in a diagonal direction may be used. In other words, which scan method among zig-zag scan, vertical directional scan, horizontal directional scan or diagonal scan will be used may be determined according to a size of a transform unit and an intra prediction mode.

An entropy encoding unit 165 may perform entropy encoding based on values calculated by a rearrangement unit 160. Entropy encoding, for example, may use various encoding methods such as exponential Golomb, CAVLC (Context-Adaptive Variable Length Coding), CABAC (Context-Adaptive Binary Arithmetic Coding).

An entropy encoding unit 165 may encode a variety of information such as residual value coefficient information and block type information in a coding unit, prediction mode information, partitioning unit information, prediction unit information and transmission unit information, motion vector information, reference frame information, block interpolation information, filtering information, etc. from a rearrangement unit 160 and prediction units 120 and 125.

An entropy encoding unit 165 may perform entropy encoding for a coefficient value in a coding unit which is input from a rearrangement unit 160.

A dequantization unit 140 and an inverse transform unit 145 dequantize values quantized in a quantization unit 135 and inversely transform values transformed in a transform unit 130. A residual value generated by a dequantization unit 140 and an inverse transform unit 145 may be combined with a prediction unit predicted by a motion prediction unit, a motion compensation unit and an intra prediction unit included in prediction units 120 and 125 to generate a reconstructed block.

A filter unit 150 may include at least one of a deblocking filter, an offset correction unit and an adaptive loop filter (ALF).

A deblocking filter may remove block distortion which is generated by a boundary between blocks in a reconstructed picture. In order to determine whether deblocking is performed, whether a deblocking filter will be applied to a current block may be determined based on a pixel included in several rows or columns included in a block. When a deblocking filter is applied to a block, a strong filter or a weak filter may be applied according to required deblocking filtering strength. In addition, in applying a deblocking filter, when horizontal filtering and vertical filtering are performed, horizontal directional filtering and vertical directional filtering may be set to be processed in parallel.

An offset correction unit may correct an offset with an original image in a unit of a pixel for an image that deblocking was performed. In order to perform offset correction for a specific picture, a region where an offset will be performed may be determined after dividing a pixel included in an image into the certain number of regions and a method in which an offset is applied to a corresponding region or a method in which an offset is applied by considering edge information of each pixel may be used.

Adaptive loop filtering (ALF) may be performed based on a value obtained by comparing a filtered reconstructed image with an original image. After a pixel included in an image is divided into predetermined groups, filtering may be discriminately performed per group by determining one filter which will be applied to a corresponding group. Information related to whether to apply ALF may be transmitted per coding unit (CU) for a luma signal and a shape and a filter coefficient of an ALF filter to be applied may vary according to each block. In addition, an ALF filter in the same shape (fixed shape) may be applied regardless of a characteristic of a block to be applied.

A memory 155 may store a reconstructed block or picture calculated through a filter unit 150 and a stored reconstructed block or picture may be provided to prediction units 120 and 125 when performing inter prediction.

Figure 2:
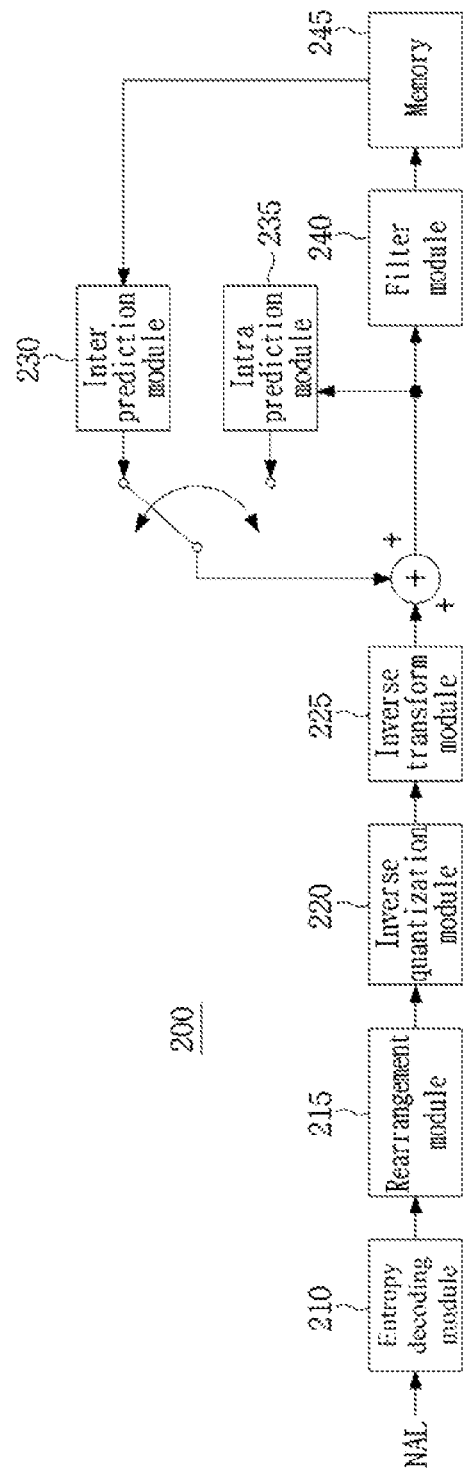
FIG. 2 is a block diagram showing an image decoding device according to an embodiment of the present disclosure.

FIG. 2 is a block diagram showing an image decoding device according to an embodiment of the present disclosure.

Referring to FIG. 2, an image decoding device 200 may include an entropy decoding unit 210, a rearrangement unit 215, a dequantization unit 220, an inverse transform unit 225, prediction units 230 and 235, a filter unit 240, and a memory 245.

When an image bitstream is input from an image encoding device, an input bitstream may be decoded according to a procedure opposite to that of an image encoding device.

An entropy decoding unit 210 may perform entropy decoding according to a procedure opposite to a procedure in which entropy encoding is performed in an entropy encoding unit of an image encoding device. For example, in response to a method performed in an image encoding device, various methods such as Exponential Golomb, CAVLC (Context-Adaptive Variable Length Coding), CABAC (Context-Adaptive Binary Arithmetic Coding) may be applied.

An entropy decoding unit 210 may decode information related to intra prediction and inter prediction performed in an encoding device.

A rearrangement unit 215 may perform rearrangement based on a method that a bitstream entropy-decoded in an entropy decoding unit 210 is rearranged in an encoding unit. Coefficients expressed in a form of a one-dimensional vector may be rearranged by being reconstructed into coefficients in a form of a two-dimensional block. A rearrangement unit 215 may receive information related to coefficient scanning performed in an encoding unit and perform rearrangement through a method in which scanning is inversely performed based on scanning order performed in a corresponding encoding unit.

A dequantization unit 220 may perform dequantization based on a quantization parameter provided from an encoding device and a coefficient value of a rearranged block.

An inverse transform unit 225 may perform transform performed in a transform unit, i.e., inverse transform for DCT, DST, and KLT, i.e., inverse DCT, inverse DST and inverse KLT for a result of quantization performed in an image encoding device. Inverse transform may be performed based on a transmission unit determined in an image encoding device. In an inverse transform unit 225 of an image decoding device, a transform technique (for example, DCT, DST, KLT) may be selectively performed according to a plurality of information such as a prediction method, a size or a shape of a current block, a prediction mode, an intra prediction direction, etc.

Prediction units 230 and 235 may generate a prediction block based on information related to generation of a prediction block provided from an entropy decoding unit 210 and pre-decoded block or picture information provided from a memory 245.

As described above, when a size of a prediction unit is the same as a size of a transform unit in performing intra prediction in the same manner as an operation in an image encoding device, intra prediction for a prediction unit may be performed based on a pixel at a left position of a prediction unit, a pixel at a top-left position and a pixel at a top position, but when a size of a prediction unit is different from a size of a transform unit in performing intra prediction, intra prediction may be performed by using a reference pixel based on a transform unit. In addition, intra prediction using N×N partitioning may be used only for the smallest coding unit.

Prediction units 230 and 235 may include a prediction unit determination unit, an inter prediction unit and an intra prediction unit. A prediction unit determination unit may receive a variety of information such as prediction unit information, prediction mode information of an intra prediction method, motion prediction-related information of an inter prediction method, etc. which are input from an entropy decoding unit 210, divide a prediction unit in a current coding unit and determine whether a prediction unit performs inter prediction or intra prediction. An inter prediction unit 230 may perform inter prediction for a current prediction unit based on information included in at least one picture of a previous picture or a subsequent picture of a current picture including a current prediction unit by using information necessary for inter prediction in a current prediction unit provided from an image encoding device. Alternatively, inter prediction may be performed based on information on some regions which are pre-reconstructed in a current picture including a current prediction unit.

In order to perform inter prediction, whether a motion prediction method in a prediction unit included in a corresponding coding unit is a skip mode, a merge mode, an AMVP mode, or an intra block copy mode may be determined based on a coding unit.

An intra prediction unit 235 may generate a prediction block based on pixel information in a current picture. When a prediction unit is a prediction unit which performed intra prediction, intra prediction may be performed based on intra prediction mode information in a prediction unit provided from an image encoding device. An intra prediction unit 235 may include an adaptive intra smoothing (AIS) filter, a reference pixel interpolation unit and a DC filter. As a part performing filtering on a reference pixel of a current block, an AIS filter may be applied by determining whether a filter is applied according to a prediction mode in a current prediction unit. AIS filtering may be performed for a reference pixel of a current block by using AIS filter information and a prediction mode in a prediction unit provided from an image encoding device. When a prediction mode of a current block is a mode which does not perform AIS filtering, an AIS filter may not be applied When a prediction mode in a prediction unit is a prediction unit which performs intra prediction based on a pixel value which interpolated a reference pixel, a reference pixel interpolation unit may interpolate a reference pixel to generate a reference pixel in a unit of a pixel equal to or less than an integer value. When a prediction mode in a current prediction unit is a prediction mode which generates a prediction block without interpolating a reference pixel, a reference pixel may not be interpolated. A DC filter may generate a prediction block through filtering when a prediction mode of a current block is a DC mode.

A reconstructed block or picture may be provided to a filter unit 240. A filter unit 240 may include a deblocking filter, an offset correction unit and ALF.

Information on whether a deblocking filter was applied to a corresponding block or picture and information on whether a strong filter or a weak filter was applied when a deblocking filter was applied may be provided from an image encoding device. Information related to a deblocking filter provided from an image encoding device may be provided in a deblocking filter of an image decoding device and deblocking filtering for a corresponding block may be performed in an image decoding device.

An offset correction unit may perform offset correction on a reconstructed image based on offset value information, a type of offset correction, etc. applied to an image when performing encoding.

ALF may be applied to a coding unit based on information on whether ALF is applied, ALF coefficient information, etc. provided from an encoding device. Such ALF information may be provided by being included in a specific parameter set.

A memory 245 may store a reconstructed picture or block for use as a reference picture or a reference block and provide a reconstructed picture to an output unit.

As described above, hereinafter, in an embodiment of the present disclosure, a coding unit is used as a term of a coding unit for convenience of a description, but it may be a unit which performs decoding as well as encoding.

In addition, as a current block represents a block to be encoded/decoded, it may represent a coding tree block (or a coding tree unit), a coding block (or a coding unit), a transform block (or a transform unit) or a prediction block (or a prediction unit) or a block to which an in-loop filter is applied, etc. according to an encoding/decoding step. In this specification, 'unit' may represent a base unit for performing a specific encoding/decoding process and 'block' may represent a pixel array in a predetermined size. Unless otherwise classified, 'block' and 'unit' may be used interchangeably. For example, in the after-described embodiment, it may be understood that a coding block (a coding block) and a coding unit (a coding unit) are used interchangeably.

FIGS. 3 to 12 show a block partition method according to the present disclosure.

In an embodiment described later, 'block' is a target of encoding/decoding and may represent any one of a coding block, a prediction block or a transform block.

One block may be partitioned into a plurality of blocks having various sizes and shapes through a tree structure. A partitioned block may be also partitioned again into a plurality of blocks having various sizes and shapes. As such, recursively partitioning a block may be defined as 'tree structure'-based partition.

The tree structure-based partition may be performed based on predetermined partition information. Here, partition information may be encoded in an encoding device and transmitted through a bitstream or may be derived from an encoding/decoding device. The partition information may include information indicating whether to partition a block (hereinafter, referred to as a partition flag). When a partition flag indicates partition of a block, a block is partitioned and moved to the next block according to encoding order. Here, the next block refers to a block that encoding will be performed first among partitioned blocks. When a partition flag indicates that a block is not partitioned, encoding information of a block is encoded to move to the next block according to whether the next block exists or terminate a partition process of a block.

Partition information may include information on tree partition. Hereinafter, a tree partition method used for block partition is described.

Figure 3:
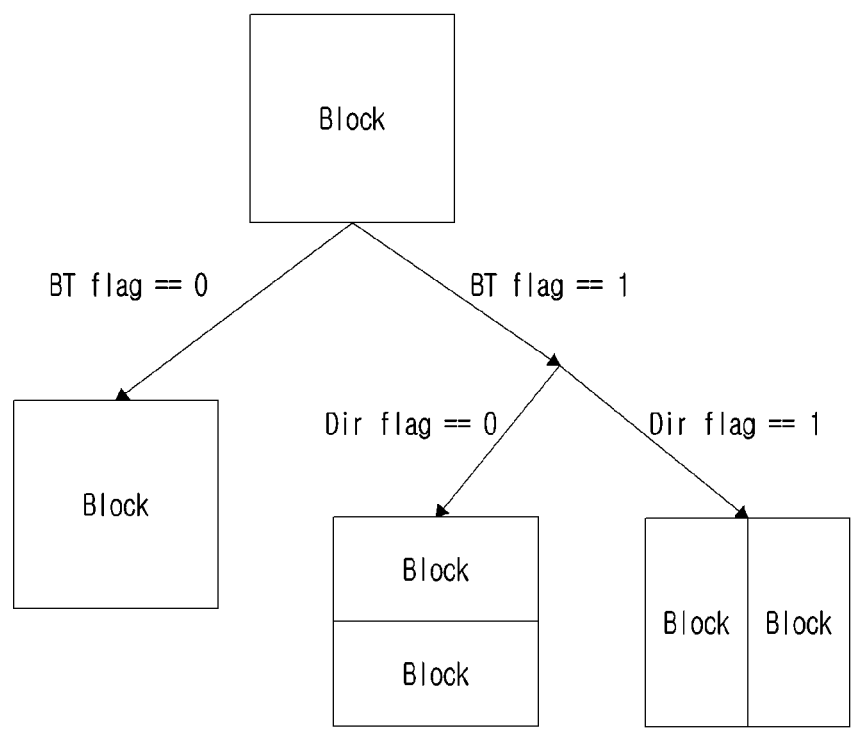

A binary tree (BT) partition method is a method of partitioning a block into two parts. Blocks generated by two partitions may have the same size. FIG. 3 shows an example that BT partition is performed on a block through a BT flag.

Whether to partition a block may be determined through a BT flag. In an example, when a BT flag is 0, BT partition is terminated. On the other hand, when a BT flag is 1, a block may be partitioned into two blocks by using a Dir flag which indicates a partition direction.

Figure 4:
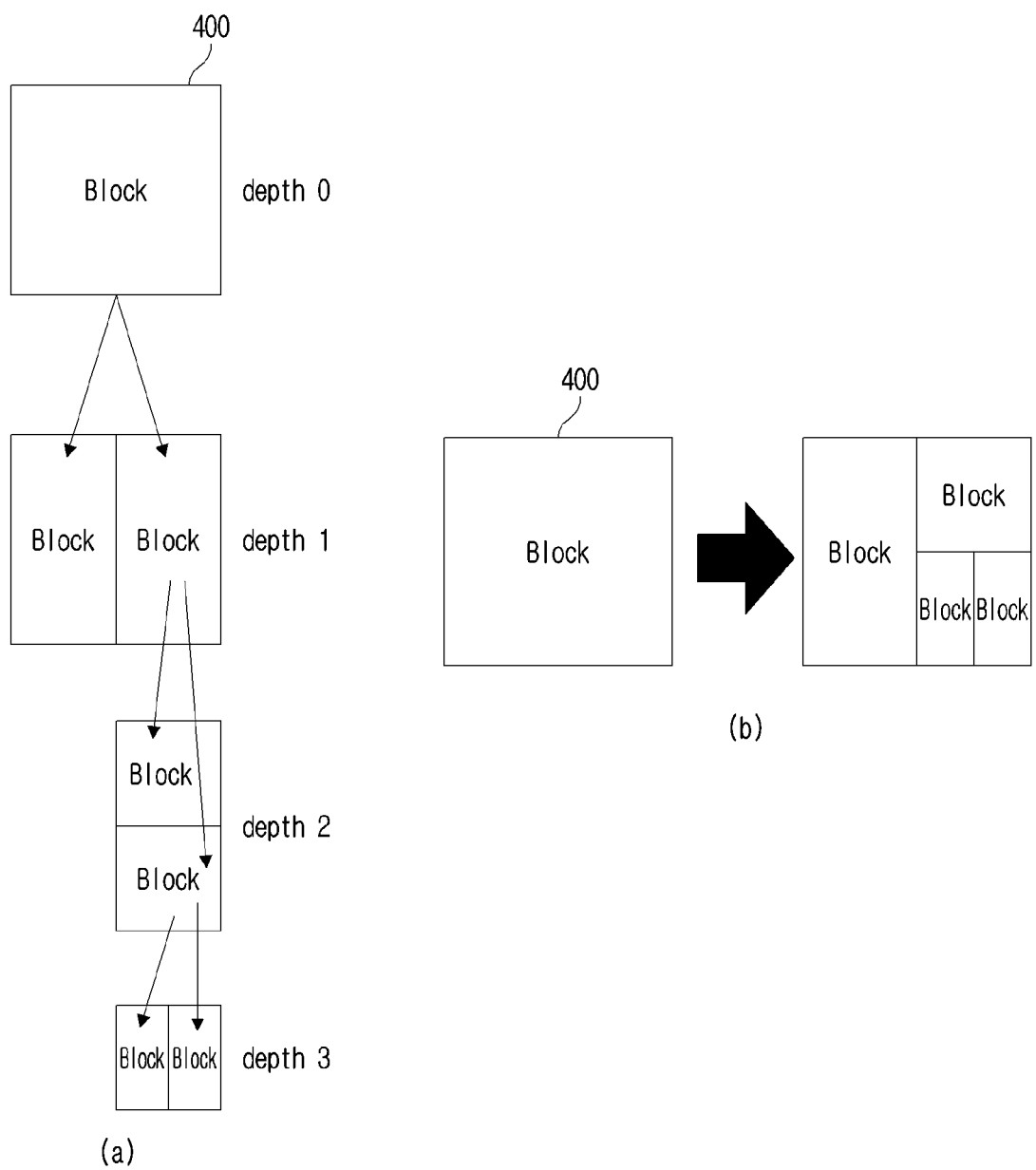

In addition, a partitioned block may be expressed as depth information. FIG. 4 shows an example of depth information.

FIG. 4(*a*) is an example showing a process in which a block 400 is partitioned through BT partition and a value of depth information. Each time a block is partitioned, a value of depth information may increase by 1. When a block of Depth N is partitioned into blocks of depth (N+1), a block of Depth N is referred to as a parent block of blocks of depth (N+1). Conversely, a block of Depth (N+1) is referred to as a child block of a block of depth N. It may be equally applied in a tree structure described later. FIG. 4(*b*) shows a finally partitioned shape when a block 400 is partitioned by using a BT as in (a).

Figure 5:
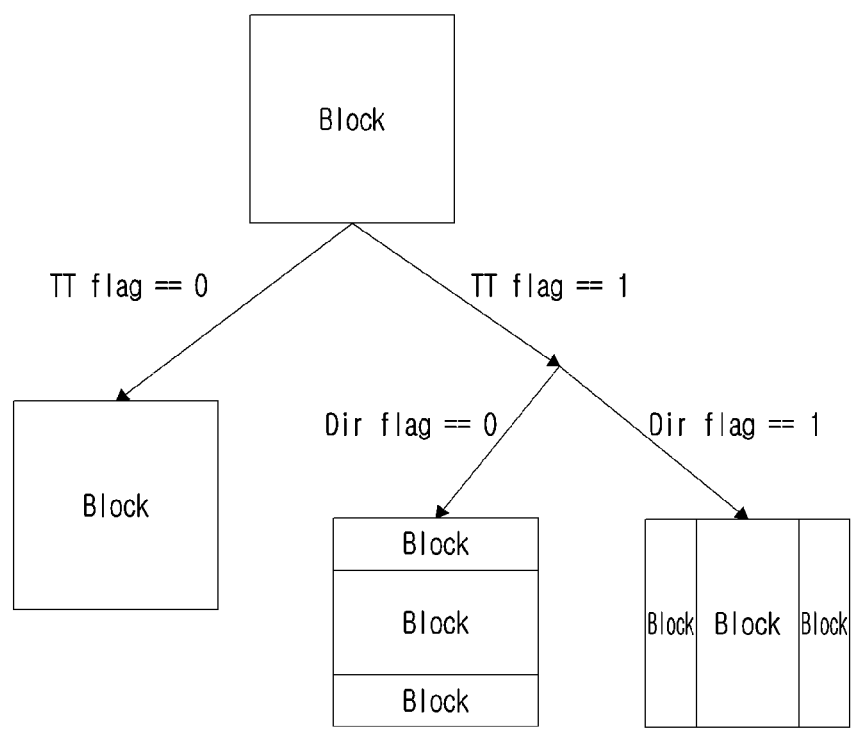

A ternary-tree (TT) partition method is a method of partitioning a block into three parts. In this case, child blocks may have a ratio of 1:2:1. FIG. 5 shows an example in which TT partition is performed on a block through a TT flag.

Whether to partition a block may be determined through a TT flag. In an example, when a TT flag is 0, TT partition is terminated. On the other hand, when a TT flag is 1, a block may be partitioned into three parts in a horizontal direction or in a vertical direction by using a Dir flag.

Figure 6:
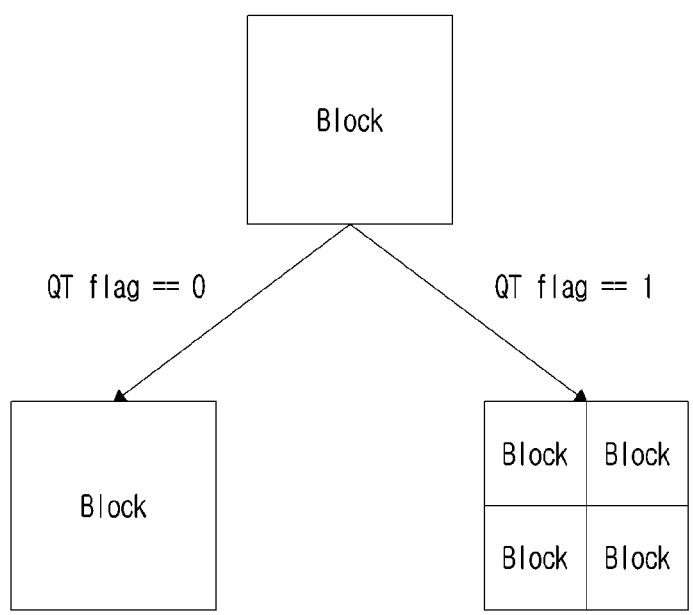

A quad-tree (QT) partition method is a method of partitioning a block into four parts. Four child blocks may have the same size. FIG. 6 shows an example in which QT partition is performed on a block through a QT flag.

Whether to partition a block may be determined through a QT flag. In an example, when a QT flag is 0, QT partition is terminated. On the other hand, when a QT flag is 1, a block may be partitioned into four parts.

Figure 7:
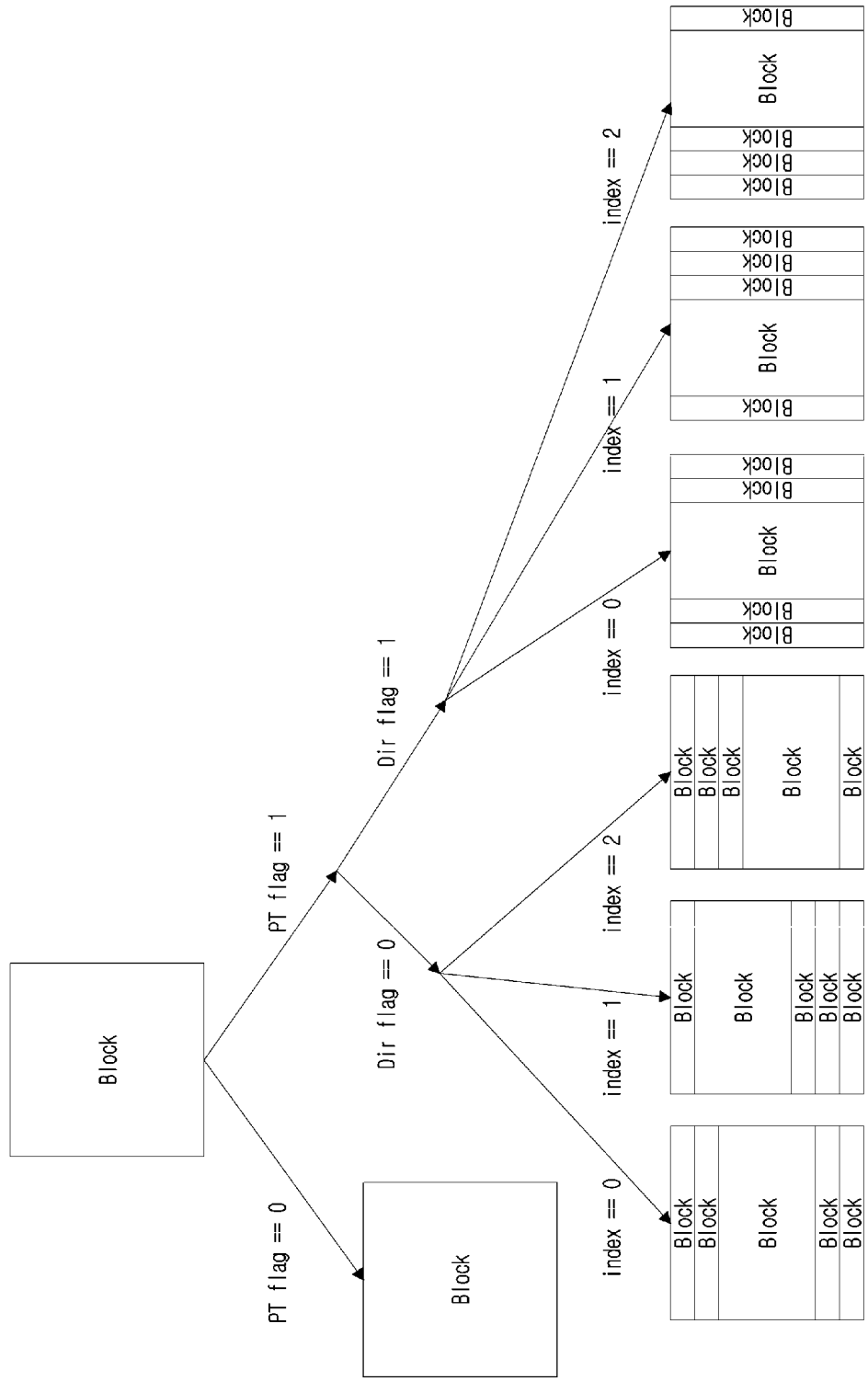

One block may be partitioned in various ways other than a BT partition, TT partition and QT partition according to FIGS. 4 to 6. In an example, a method of partitioning one block into five child blocks may be applied. FIG. 7 shows an example of a PT partition method in which a block is partitioned into five parts by using a penta-tree (PT) flag.

Whether to partition a block into five parts may be determined through a PT flag for a block. When a PT flag is 0, PT partition is terminated. When a PT flag is 1, in which direction of a horizontal direction or a vertical direction partition is performed may be determined by using a Dir flag indicating a partition direction.

In addition, a partition type may be indicated by using an index. When five partitions are applied, four child blocks may have the same size and the remaining one child block may have a size four times that of other child blocks. In this case, a position of a child block which is larger than other child blocks may be indicated by an index. In other words, the index may be defined as specifying any one of a plurality of PT partition types which are predefined in an encoding/decoding device or specifying a position of the largest child block of five child blocks.

A plurality of PT partition types may include a first type with a partition ratio of 1:1:4:1:1, a second type with a partition cost of 1:4:1:1:1 and a third type with a partition ratio of 1:1:1:4:1. As shown in FIG. 7, partition may be performed at a ratio of 1:1:4:1:1, 1:4:1:1:1 or 1:1:1:4:1, respectively, according to a value of an index, i.e., 0 to 2.

Figure 8:
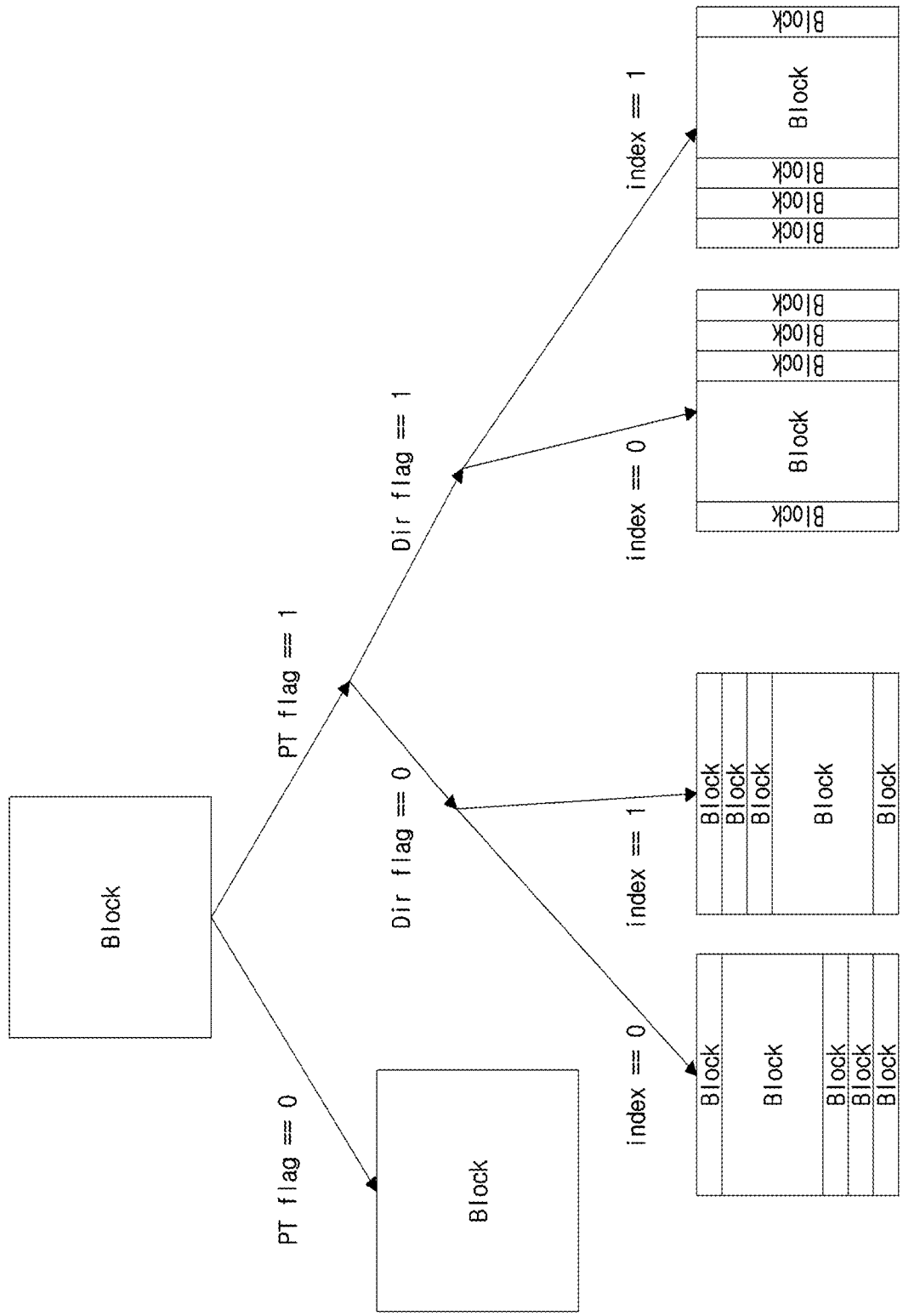

Alternatively, a plurality of PT partition types may include only two types among a first type to a third type. For example, a plurality of PT partition types may be configured with only a second type (1:4:1:1:1) and a third type (1:1:1:4:1) and partition may be performed only with any one of a second type or a third type. In this case, an index belongs to a scope of 0 to 1. FIG. 8 shows an example related to it.

Figure 9:
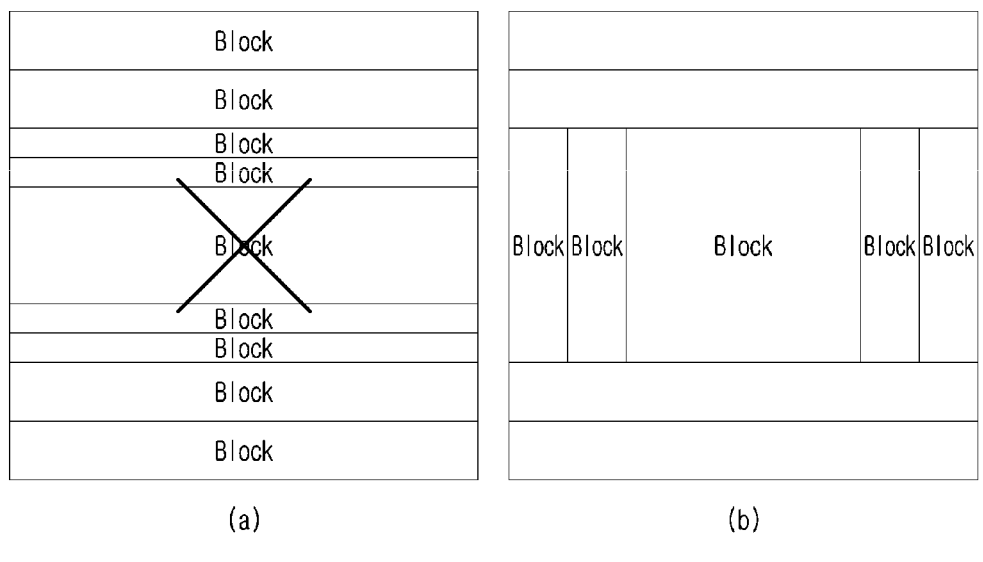

In an example of FIGS. 7 and 8, when the largest block among five blocks according to PT partition is additionally partitioned, a limitation on a partition direction may be applied. In an example, when a parent block is partitioned in a horizontal direction, only partition in a vertical direction may be allowed for a child block. FIG. 9 is an example in which the above-mentioned limitation is applied. In FIG. 7, when a parent block is partitioned by using PT flag=0, Dir flag=0 and index=0 and PT partition is additionally applied to the largest child block, partition in a horizontal direction is not allowed as shown in FIG. 9(a) and only partition in a vertical direction is allowed as shown in FIG. 9(b). Or conversely, when the largest child block is additionally partitioned, a method of applying a partition direction of a parent block as it is is also possible. In two examples above, signaling of a dir flag may be omitted for the largest child block and a dir flag of the largest child block may be derived by using a dir flag of a parent block. Also in an example of FIG. 8, the above-described limitation may be equally applied. Alternatively, the above-described limitation may be also equally applied to the remaining four child blocks of the same size.

As another example, additional partition may be allowed only for the largest child block among five child blocks (i.e., a child block with a ratio of 4). In this case, for the largest child block, application of PT partition is not allowed, but application of at least one of a BT, a TT or a QT may be allowed. In this case, the above-described limitation may be also applied to BT, TT or QT partition. In an example, BT, TT or QT partition may be forced to be applied only in a direction different from a PT partition direction of a parent block. Alternatively, additional PT partition may be allowed even for the largest child block. But, it may be allowed in a limited manner only when a size of the largest child or parent block is greater than or equal to a predetermined threshold size. Here, a size may be expressed as a width, a height, a ratio of a width and a height, a product of a width and a height, the minimum/maximum value of a width and a height, etc. A threshold size may be an integer of 4, 8, 16, 32, 64, 128, 256 or more.

Alternatively, for small child blocks among child blocks, application of PT partition is not allowed, but application of at least one of a BT, a TT or a QT may be allowed. In this case, the above-described limitation may be also equally applied to small child blocks. In an example, BT, TT or QT partition may be forced to be applied only in a direction different from a PT partition direction of a parent block.

Alternatively, the above-described limitation may be applied only to the largest child block and the above-described limitation may not be applied to small child blocks. Conversely, the above-described limitation may not be applied to the largest child block and the above-described limitation may be applied only to small child blocks. Alternatively, the above-described limitation may be applied only when a size of a parent block or a child block according to PT partition is smaller than or equal to a predetermined threshold size. Conversely, the above-described limitation may be applied only when a size of a parent block or a child block according to PT partition is greater than or equal to a predetermined threshold size. Since a size and a threshold size here are the same as described above, a detailed description will be omitted.

Whether PT partition is allowed may be determined by at least one of a size, a shape or a depth of a block. In an example, PT partition may be allowed only for a coding tree block or may be allowed only for a block with a size of 128×128, 64×64 or 32×32 or more. Alternatively, PT partition may be allowed only when the minimum value of a width or a height of a block is greater than or equal to 128, 64 or 32. Alternatively, PT partition may be allowed only for a square block and may not be allowed for a non-square block. Alternatively, PT partition may be allowed depending on a size regardless of a shape of a block.

A parent block may be partitioned into four parts only in any one direction of a horizontal direction or a vertical direction, which is hereinafter referred to as a modified four-partition method. A parent block may be asymmetrically partitioned into four child blocks. Here, at least one of four child blocks may be partitioned to have a size different from the other one. For example, a partition type according to a modified four-partition method may be defined as shown in FIG. 10. A partition type of index 0 is a type of partitioning a width or a height of a parent block at a ratio of 1:4:2:1, a partition type of index 1 is a type of partitioning a width or a height of a parent block at a ratio of 1:2:4:1, a partition type of index 2 is a type of partitioning a width or a height of a parent block at a ratio of 1:4:1:2 and a partition type of index 3 is a type of partitioning a width or a height of a parent block at a ratio of 2:1:4:1. FIG. 10 shows four partition types as a partition type according to a modified four-partition method, but it is just an example, and a partition type according to a modified four-partition method may be configured with only part, not all, of four partition types. Alternatively, a partition type according to a modified four-partition method may further include a partition type that partition is performed so that four child blocks have the same size through symmetric partition. Any one of a plurality of partition types may be selectively used and for this purpose, index information may be encoded/decoded. Index information may be encoded and transmitted in an encoding device or may be derived based on a predetermined encoding parameter in a decoding device. An encoding parameter may refer to a partition type or a size of a higher block having a depth smaller than a parent block, a size or a position of a parent block, etc.

Figure 11:
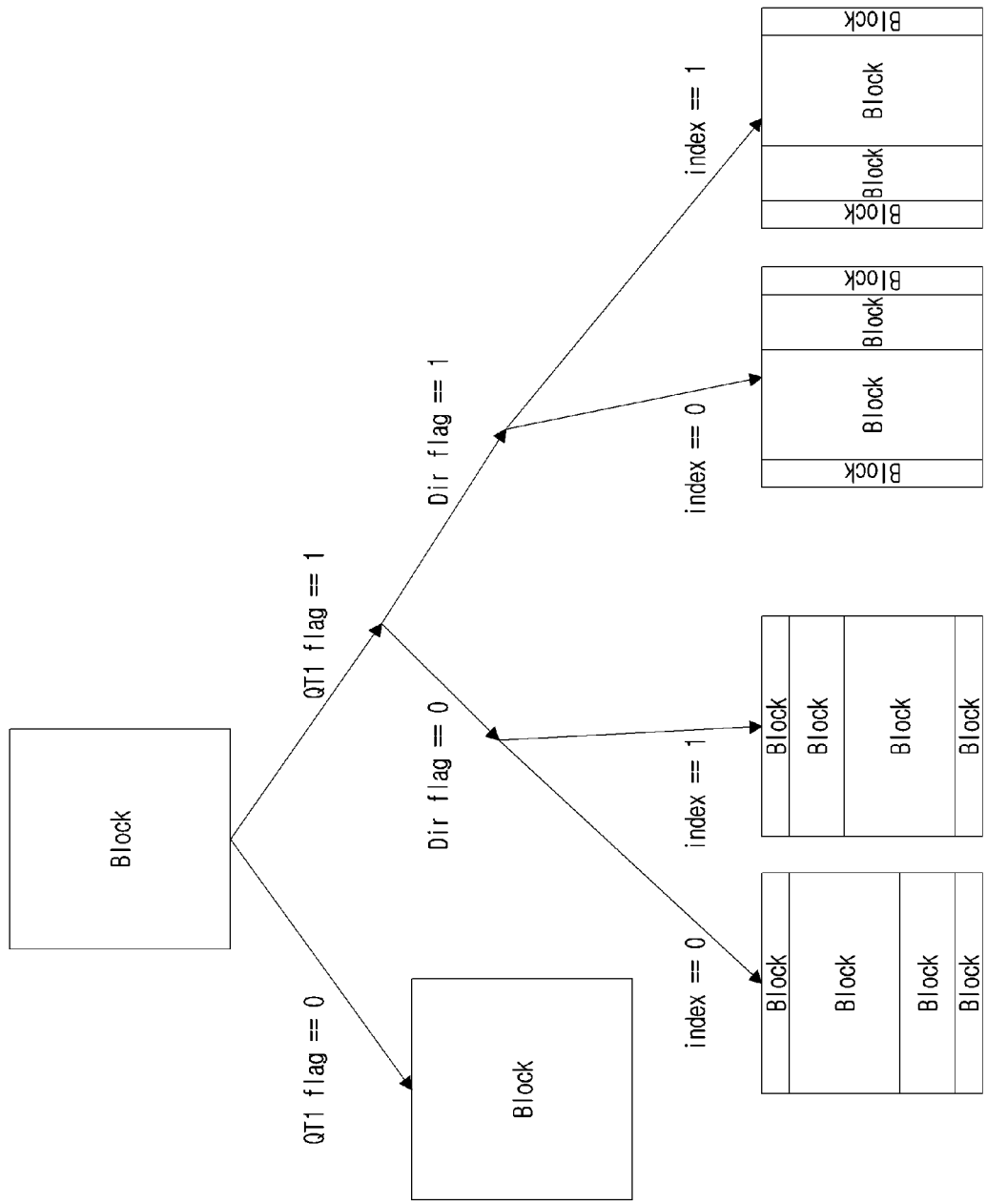

FIG. 11 shows a partition method for a case when a partition type according to a modified four-partition method (QT1) is configured with only partition types of index 0 to 1 shown in FIG. 10.

Whether to partition a block is determined through a QT1 flag. For example, when a QT1 flag is 0, partition is terminated without being performed. On the other hand, when a QT1 flag is 1, a Dir flag indicating a partition direction is used to determine whether partition will be performed in a horizontal direction or in a vertical direction. In addition, a partition type is indicated by additionally using an index and a parent block may be partitioned at a ratio of 1:4:2:1 or 1:2:4:1 according to an index value.

Figure 12:
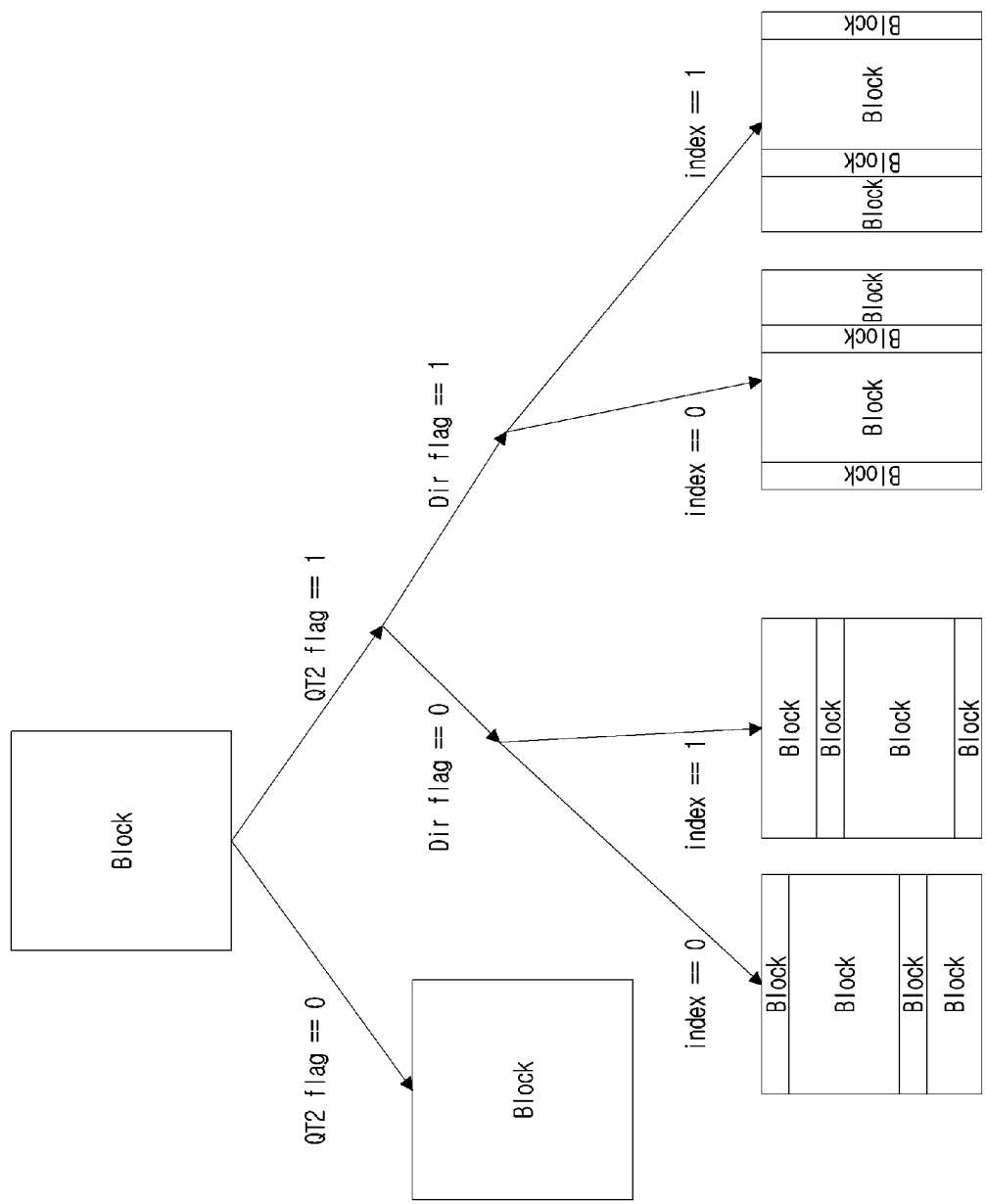

Alternatively, a four-partition method (QT2) different from that in FIG. 11 is also possible. FIG. 12 is an example showing it.

FIG. 12 shows a partition method for a case when a partition type according to a modified four-partition method (QT2) is configured with only partition types of index 2 to 3 shown in FIG. 10.

Whether to partition a block is determined through a QT2 flag. For example, when a QT2 flag is 0, partition is terminated without being performed. On the other hand, when a QT2 flag is 1, a Dir flag indicating a partition direction is used to determine whether partition will be performed in a horizontal direction or in a vertical direction. In addition, a partition type is indicated by additionally using an index and a parent block may be partitioned at a ratio of 1:4:1:2 or 2:1:4:1 according to an index value.

Even in a modified four-partition method, a limitation may be applied to a partition direction in a way similar to PT partition seen in FIG. 9. In an example, assume that a parent block is partitioned at a ratio of 1:4:2:1 in a horizontal direction and a child block with a ratio of 4 or 2 is additionally partitioned. In this case, a child block with a ratio of 4 or 2 may be partitioned by using a Dir flag of a parent block without signaling of a Dir flag. In an example, a partition direction of a child block may be determined as a direction different from that of a parent block. Alternatively, the limitation may be applied only to a block with a ratio of 4 and the limitation may be also applied only to a block with a ratio of 2. Alternatively, the limitation may be also applied only to a block with a ratio of 1. Alternatively, the limitation may be applied only to a block with a ratio of 4 and 2 and the limitation may not be applied to a block with a ratio of 1. Alternatively, the above-described limitation may be applied only when a size of a parent block or a child block according to a modified four-partition method is smaller than or equal to a predetermined threshold size. Conversely, the above-described limitation may be applied only when a size of a parent block or a child block according to a modified four-partition method is greater than or equal to a predetermined threshold size. Since a size and a threshold size here are the same as described above, a detailed description will be omitted.

As another example, additional partition may be allowed only for at least one of a block with a ratio of 4 or a block with a ratio of 2 among child blocks. In an example, at least one of a BT, TT, QT, PT or modified four-partition method may be applied to a child block above. In this case, the above-described limitation may be also applied to a BT, TT, QT, PT or modified four-partition method. In an example, a BT, TT, QT, PT or modified four-partition method may be forced to be applied only in a direction different from a PT partition direction of a parent block.

Alternatively, additional partition may be allowed for small child blocks of child blocks (i.e., a block with a ratio of 1). In this case, the above-described limitation may be also applied to small child blocks.

Whether a modified four-partition method is allowed may be determined by at least one of a size, a shape or a depth of a block. In an example, a modified four-partition method may be allowed only for a coding tree block or may be allowed only for a block with a size of 128×128, 64×64 or 32×32 or more. Alternatively, a modified four-partition method may be allowed only when the minimum value of a width or a height of a block is greater than or equal to 128, 64 or 32. Alternatively, a modified four-partition method may be allowed only for a square block and may not be allowed for a non-square block. Alternatively, a modified four-partition method may be allowed depending on a size regardless of a shape of a block.

Information indicating whether to use tree partition methods such as the above-described BT, TT, QT, PT and modified four-partition method may be signaled to a decoding device through a higher header such as a video parameter set (VPS), a sequence parameter set (SPS), a picture parameter set (PPS), a picture header (PH) and a slice header (SH), respectively.

Alternatively, information indicating whether to use these tree partition methods may be signaled to a decoding device per region where parallel processing is performed, respectively.

The above-described tree partition methods may be used interchangeably with priority. A priority may be signaled per higher header or region where parallel processing is performed.

At least one of the above-described partition methods may be applied when a coding block is partitioned into a plurality of coding blocks. Alternatively, at least one of the above-described partition methods may be applied when a coding block is partitioned into a plurality of prediction blocks or may be applied when a coding block is partitioned into a plurality of transform blocks. Alternatively, at least one of the above-described partition methods may be applied when one prediction block is partitioned into a plurality of sub-blocks for prediction in a unit of a sub-block. Alternatively, at least one of the above-described partition methods may be applied when one transform block is partitioned into a plurality of sub-blocks for transform in a unit of a sub-block.

FIGS. 13 to 17 show encoding order according to a block partition method according to the present disclosure.

Partition information according to the present disclosure may additionally include encoding order between child blocks other than a block partition method using a partition flag. Hereinafter, when a parent block is partitioned into child blocks through tree partition, an example of coding order information (COI) of child blocks is described.

Figure 13:
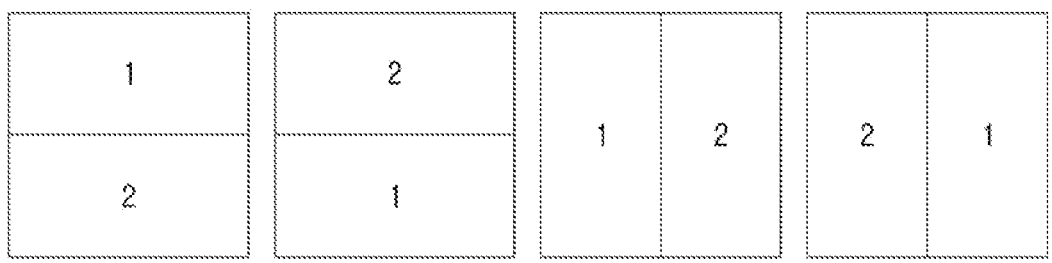

FIG. 13 shows encoding order which may be used for BT partition.

In FIG. 13, a number allocated to each block represents encoding order. As described in FIG. 3, when a BT flag is configured as 1 and partition is performed, information representing encoding order of a child block may be additionally signaled. When a BT flag is 0, partition into child blocks is not performed, so there is no need to signal information representing encoding order. The number of encoding orders available according to a partition method is expressed as a value of (partition direction)×(number of partitions)! and for BT partition, it becomes 2×2! (i.e., 4).

Figure 14:
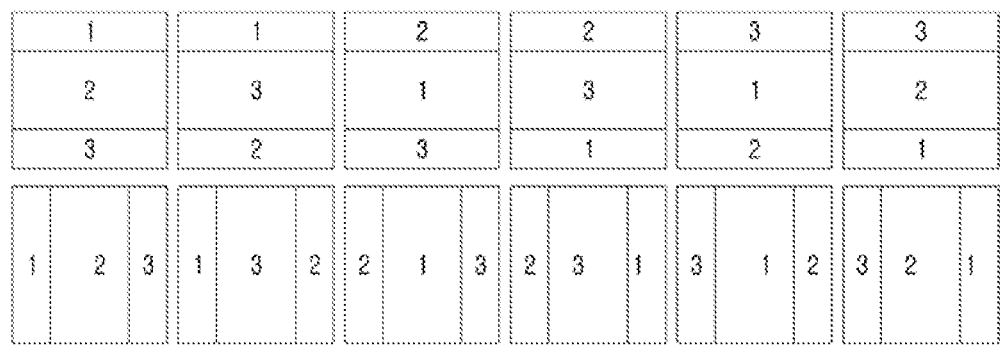

FIG. 14 shows encoding order which may be used for TT partition.

In FIG. 14, a number allocated to each block represents encoding order. As described in FIG. 5, when a TT flag is configured as 1 and partition is performed, information representing encoding order of a child block may be additionally signaled. When a TT flag is 0, partition into child blocks is not performed, so there is no need to signal information representing encoding order. For TT partition, the number of available encoding orders becomes 2×3! (i.e., 12).

Figures 15, 16:
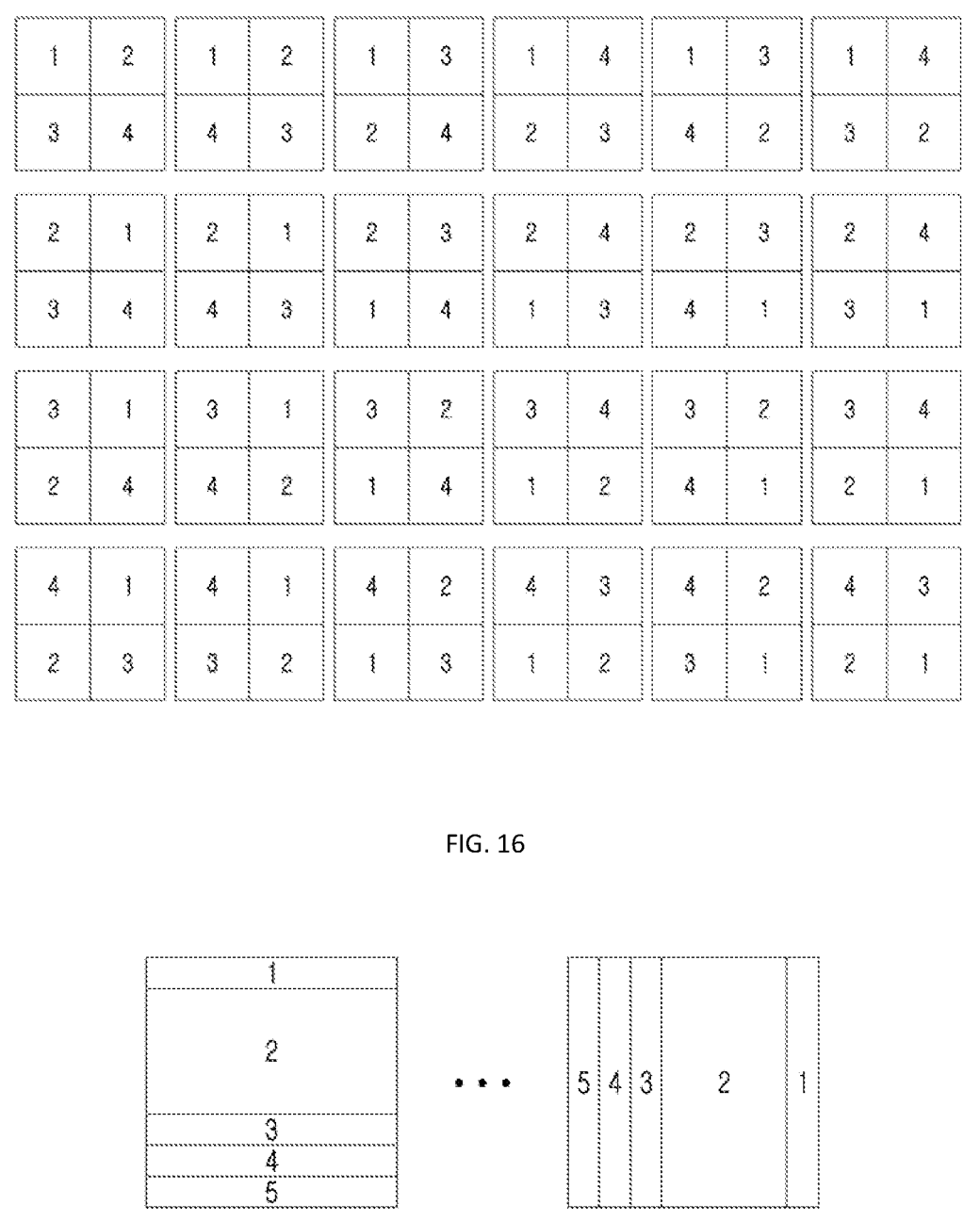

FIG. 15 shows encoding order which may be used for QT partition.

In FIG. 15, a number allocated to each block represents encoding order. As described in FIG. 6, when a QT flag is configured as 1 and partition is performed, information representing encoding order of a child block may be additionally signaled. When a QT flag is 0, partition into child blocks is not performed, so there is no need to signal information representing encoding order. QT partition refers to partition into four parts, and there is no partition direction, so the number of available encoding orders becomes 1×4! (i.e., 24).

Also for PT partition, similarly to the above-described method, when a PT flag is configured as 1 and partition is performed, information representing encoding order of a child block may be additionally signaled. When a PT flag is 0, partition into child blocks is not performed, so there is no need to signal information representing encoding order. PT partition refers to partition into five parts, and partition in a horizontal or vertical direction is performed, so the number of available encoding orders becomes 2×5! (i.e., 240). FIG. 16 is an example showing some of 240 encoding orders.

Also in an example of FIG. 8, FIG. 11 or FIG. 12, in the same manner as the above-described method, information representing encoding order may be signaled only when partition is performed. Likewise, the number of available encoding orders may be also calculated as (partition direction)×(number of partitions)!.

Alternatively, for simplicity, as in FIG. 13 to FIG. 16, all available encoding orders may not be used as a candidate. In an example, an encoding direction may be signaled according to a partition direction. An encoding direction may be configured as at least one of a left-to-right, right-to-left, top-to-bottom, bottom-to-top, diagonal or reverse diagonal direction. In an example, when a block is partitioned into two parts as in FIG. 13, an encoding direction may be signaled according to whether it is partitioned in a horizontal direction or in a vertical direction. When a block is partitioned horizontally, in which direction of a top-to-bottom direction or a bottom-to-top direction encoding is performed may be signaled. Conversely, when a block is partitioned vertically, in which direction of a left-to-right direction or a right-to-left direction encoding is performed may be signaled. Likewise, the same contents may be also applied to FIG. 14 to FIG. 16.

As another example, an encoding start position and/or end position or an encoding start position and/or progress direction may be signaled. In an example, unlike an example of FIG. 15, when QT partition is applied, a zigzag scan method is always used, but only an encoding start position and progress direction may be signaled. FIG. 17 shows an example related to it.

In an example of FIG. 17, information indicating a block with the first encoding order and information representing whether a progress direction is horizontal or vertical may be encoded.

Figure 18:
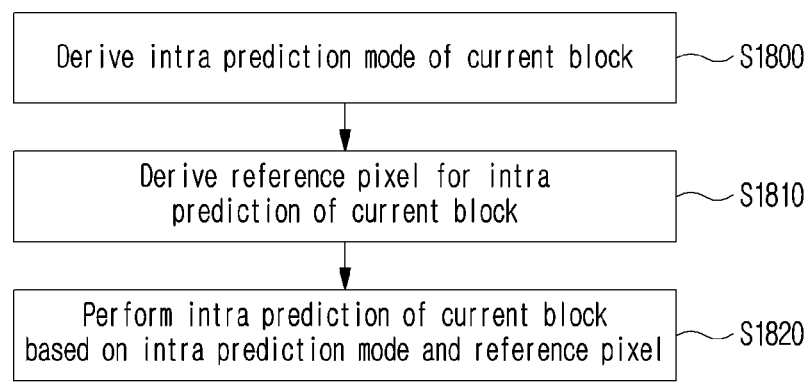
FIG. 18 shows an intra prediction method in an encoding/decoding device according to the present disclosure.

FIG. 18 shows an intra prediction method in an encoding/decoding device according to the present disclosure.

A block may be encoded by applying intra prediction, a technology of removing redundant data which exists spatially. When intra prediction is applied, a prediction block configured with prediction values (prediction pixels) for an original block is generated by using a surrounding pixel adjacent to an original block or a pixel belonging to a line N away from an original block as a reference pixel. Afterwards, a residual block, a difference value between an original block and a prediction block, is generated to remove redundant data.

In reference to FIG. 18, an intra prediction mode of a current block may be derived S1800.

Here, a current block may be obtained by partitioning a coding block based on at least one of the above-described partition methods. An intra prediction mode may be derived as any one of intra prediction modes which are predefined in an encoding/decoding device.

Figure 19:
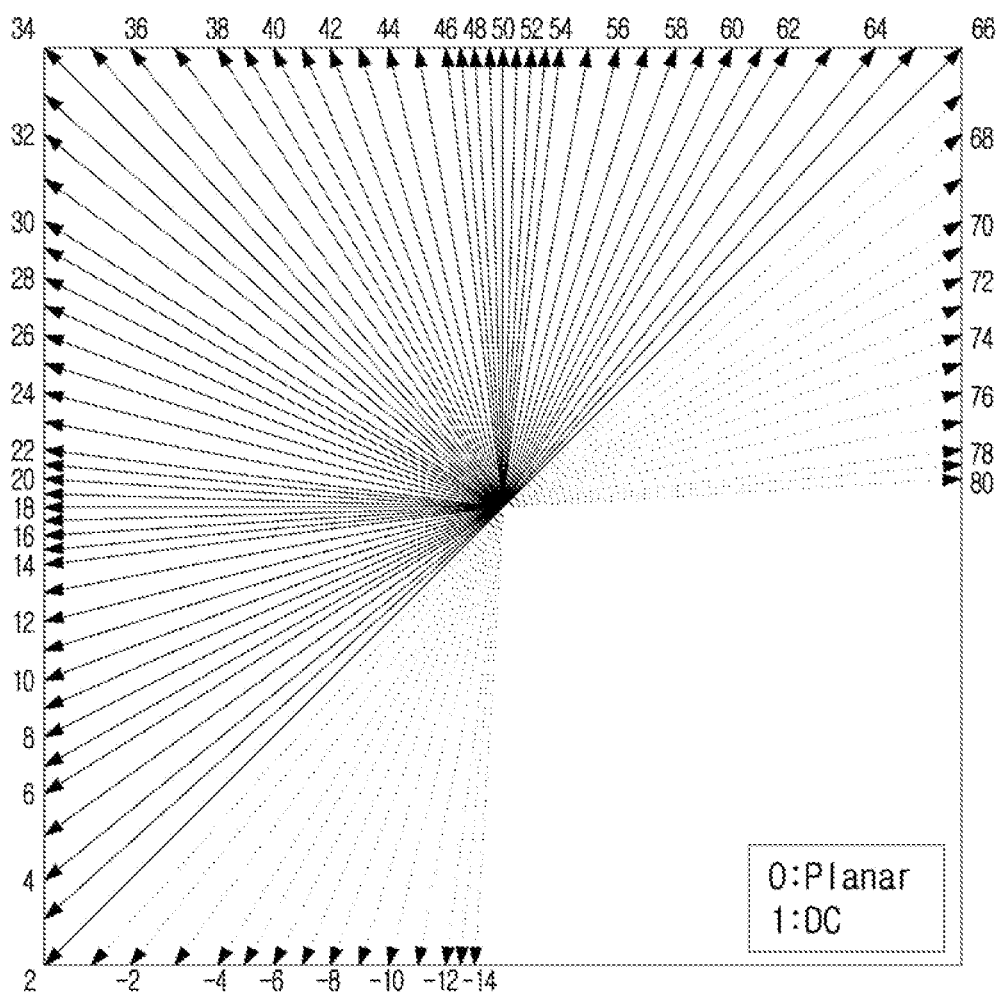
FIGS. 19 and 20 show predefined intra prediction modes available for a current block.
Figure 20:
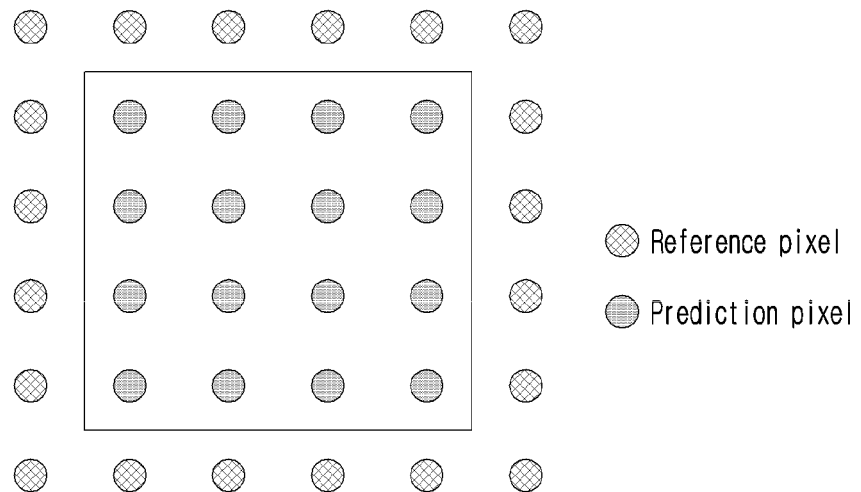
Figure 20:
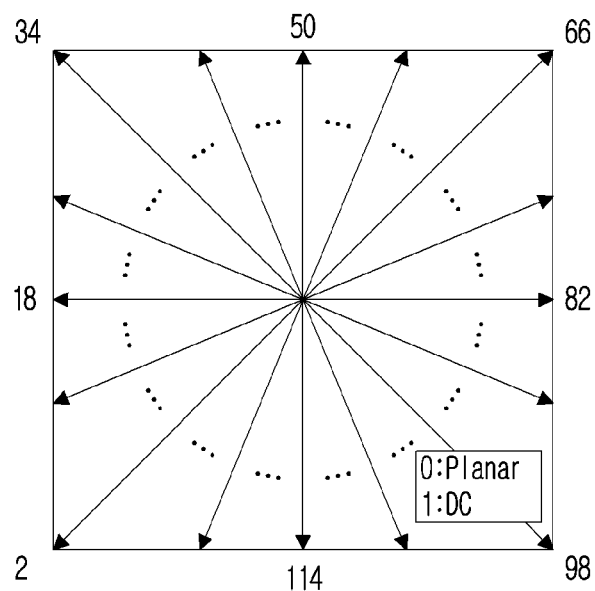

FIGS. 19 and 20 show predefined intra prediction modes available for a current block.

In reference to FIG. 19, number 0 is allocated to a prediction method using a plane, which is referred to as a planar mode or mode 0. In addition, number 1 is allocated to a prediction method using DC, which is referred to as a DC mode or mode 1. For other methods using directivity (directional mode), number from −14 to 80 is allocated and a direction is indicated with an arrow. In an example, mode 18 represents a prediction method using a horizontal direction and mode 50 represents a prediction method using a vertical direction.

According to coding order information (COI) information described above, an available reference pixel may be expanded around a block to be encoded. Accordingly, a reference pixel around a block may exist not only on the left and top of a block, but also on the right and/or bottom of a block. Accordingly, an intra prediction mode using a reference pixel on the right and/or bottom may be additionally defined. FIG. 20 shows an example in which a directional mode of FIG. 19 is expanded in full 360 degrees. Here, unlike FIG. 19, a directional mode is expressed as number 2 to 129 for convenience of a description.

Figures 21, 22:
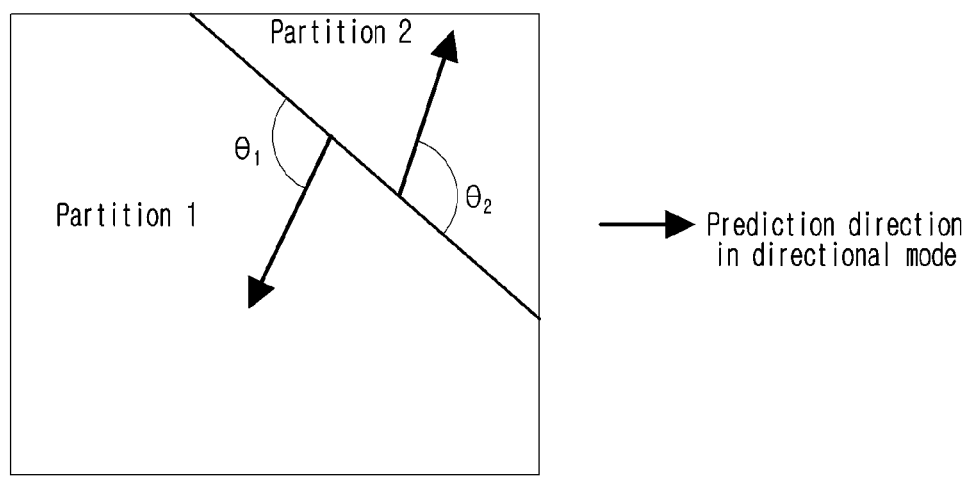

A current block may be partitioned into a plurality of partitions. Partition here may be performed based on at least one of the above-described partition methods. In this case, according to a partition type of a current block or a size or a shape of a partition, a scope of an intra prediction mode which may be used by each partition may be adjusted. FIG. 21 shows an example related to it.

In FIG. 21, a scope of $\theta_1$ and $\theta_2$ may be adjusted. In an example, each of $\theta_1$ and $\theta_2$ may have a value between A degrees and B degrees. A value of A and B may be signaled through a higher header or may have a preconfigured value in an encoding/decoding device.

Alternatively, an angle range may be determined according to a partition direction. For example, when a current block is partitioned in a 45-degree direction at a top-left position, partition 1 may be configured not to use an intra prediction mode which exceeds 45 degrees and partition 2 may be configured not to use an intra prediction mode which is less than 45 degrees.

In the example, a case in which a directional mode is applied to diagonally partitioned partitions was described. Similar to a directional mode, a planar mode or a DC mode may be also applied to diagonally partitioned partitions.

Alternatively, a planar mode or a DC mode may be also configured not to be applied to diagonally partitioned partitions.

Alternatively, if one of two partitions is a planar mode or a DC mode, a directional mode may be configured to be applied to one remaining partition all the time. Alternatively, the opposite case is also possible.

Alternatively, if one of two partitions is a planar mode or a DC mode, a DC mode or a planar mode may be configured to be applied to one remaining partition all the time. Alternatively, the opposite case is also possible.

When an intra prediction mode is encoded, an index specifying any one of a plurality of MPM candidates belonging to a MPM list may be signaled after configuring a most probable mode (MPM) list. A decoding device may configure a MPM list in the same way as an encoding device and derive an intra prediction mode of a current block based on a MPM list and a signaled index.

Figure 23:
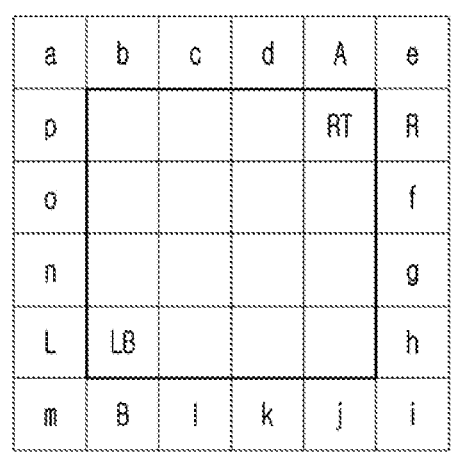

FIGS. 22 and 23 show a surrounding reference position used when configuring a MPM list.

A surrounding reference position shown in FIGS. 22 and 23 may mean one pixel or block, respectively. It is assumed that the surrounding reference position is included in a different block around a current block.

In reference to FIG. 22, LB refers to a position of a pixel at a bottom-leftmost position in a current block and RT refers to a position of a pixel at a top-rightmost position in a current block. In an example, a MPM list may be configured by using intra prediction modes existing in a block including L and a block including A. Afterwards, an intra prediction mode of a current block may be signaled by using information indicating whether an intra prediction mode of a current block is included in a MPM list, index information (MPM index) indicating the same mode in a MPM list or information specifying any one of the remaining modes if it is not included in a MPM.

Alternatively, a MPM list may be configured by using an intra prediction mode of at least one of a block including a sample (h or g) at a left-middle position and a block including a sample (d or c) at a top-center position. Alternatively, a MPM list may be configured by using an intra prediction mode of at least one of a block including a sample (f) at a top-left position and a block including a sample (b) at a top-left position.

In addition, when a reference pixel at a right and bottom position of a current block is available, a MPM according to FIG. 22 may be expanded. Specifically, a MPM candidate may be derived by using at least one of a neighboring block adjacent to the right of a current block and/or a neighboring block adjacent to the bottom of a current block.

In FIG. 23, LB refers to a position of a pixel at a bottom-leftmost position in a current block and RT refers to a position of a pixel at a top-rightmost position in a current block. In an example, a MPM list may be configured by using intra prediction modes existing in a block including L and a block including A. Alternatively, a MPM list may be configured by using an intra prediction mode existing in at least one of a block including R and a block including B.

Alternatively, a MPM list may be configured by using a bottom block including at least one of a bottom-center (k or l) sample or a bottom-right (j) sample or by using a right block including at least one of a right-middle (g or f) sample or a bottom-right (h) sample.

Alternatively, only any one representative mode among intra prediction modes of surrounding blocks at a right and bottom position described above may be added to a MPM list. Here, a representative mode may refer to the minimum value, the maximum value or a mode among intra prediction modes of surrounding blocks at a right and bottom position and may refer to a mode at a fixed position pre-promised in an encoding/decoding device.

A right block and/or a bottom block may be used to derive a MPM candidate instead of a left block and/or a top block. Alternatively, a MPM candidate may be derived by further using at least one of a right block or a bottom block along with a left and/or top block.

When a current block is partitioned into a plurality of partitions, a plurality of partitions may share one intra prediction mode. Alternatively, an intra prediction mode may be derived per each partition of a current block.

An intra prediction mode of two partitions may be configured to be derived only through a MPM candidate. In other words, when a current block is partitioned into a plurality of partitions, an intra prediction mode of each partition may have the same value as one of a plurality of MPM candidates. In this case, encoding/decoding of a MPM flag is omitted, and its value may be considered as 1 (infer). In addition, a MPM index may be signaled for each of a plurality of partitions.

Alternatively, an intra prediction mode of a first partition may be derived based on a MPM candidate, while an intra prediction mode of a second partition may be configured as a default mode. A default mode may include at least one of a planar mode, a DC mode, a vertical mode, a horizontal mode or a diagonal mode. When a plurality of default modes are defined, any one of a plurality of default modes may be selectively used. Index information for the selection may be signaled and a mode with the highest priority among a plurality of default modes may be used. A priority may be given in order of a planar mode, a DC mode, a vertical mode (or a horizontal mode) and a diagonal mode, but it is not limited thereto.

Alternatively, an intra prediction mode of a second partition may be derived by adding/subtracting an offset to/from an intra prediction mode of a first partition. Here, an offset may be predefined in an encoding/decoding device. Alternatively, offset information (e.g., an absolute value and/or a sign) may be encoded and signaled.

In addition, an intra prediction mode used per each partition may be signaled. In this case, after configuring a most probable mode (MPM) list to encode intra prediction modes, index information specifying any one of a plurality of MPM candidates belonging to a MPM list may be signaled per each partition. In an example, an intra prediction mode of a first partition may be determined by a first MPM index and an intra prediction mode of a second partition may be determined by a second MPM index. In this case, when a MPM index of a second partition is greater than a MPM index of a first partition, a value obtained by subtracting 1 from a MPM index of a second partition may be encoded/decoded as a second MPM index. In other words, when an intra prediction mode of a second partition is equal to or greater than an intra prediction mode of a first partition, an intra prediction mode of a second partition may be derived by using a MPM index obtained by adding 1 to a second MPM index.

A flag representing whether an intra prediction mode of a second partition is derived based on an intra prediction mode of a first partition may be defined. Here, when a flag is a first value, an intra prediction mode of a second partition may be derived based on an intra prediction mode of a first partition and when a flag is a second value, an intra prediction mode of a second partition may be derived based on the above-described default mode or may be derived based on index information signaled for a second partition.

Alternatively, a flag representing whether an intra prediction mode of a second partition is derived based on a default mode may be defined. Here, when a flag is a first value, an intra prediction mode of a second partition may be derived based on the above-described default mode and when a flag is a second value, an intra prediction mode of a second partition may be derived based on index information signaled for a second partition.

Alternatively, a MPM list may be generated per partition. In an example, a first MPM list for a first partition and a second MPM list for a second partition may be generated. In this case, at least one of neighboring blocks for a first MPM list may be different from any one of neighboring blocks for a second MPM list. In an example, a first MPM list may be generated by using a left and top neighboring block and a second MPM list may be generated by using a right and bottom neighboring block. Alternatively, when a second MPM list is generated, it may be also generated by using only candidates different from candidates existing in a first MPM list. The number of neighboring blocks available for configuring a first MPM list may be different from the number of neighboring blocks available for configuring a second MPM list. The number of neighboring blocks available for configuring a first MPM list may be N and the number of neighboring blocks available for configuring a second MPM list may be (N+1) or more. Here, a first partition refers to a partition including a top-left sample or a top-right sample in a current block and N may be 2, 3, 4 or more.

Two or more intra prediction modes may be derived for a current block. In an example, two intra prediction modes m1 and m2 may be encoded by using a MPM list and signaled, respectively.

Alternatively, only intra prediction modes existing in a MPM list may be used. In this case, m1 and m2 may be signaled by using a MPM index, respectively.

Alternatively, although it is not included in a MPM list, an intra prediction mode which exists around a current block may be used and then, it may be designated as an index and used.

Alternatively, a priority may be given to a specific mode. In an example, a planar mode or a DC mode may be configured to be always used for m1. Afterwards, contrary to m1, a DC mode or a planar mode may be configured to be used for m2. In this case, only information representing whether m1 is a planar mode or a DC mode may be signaled.

Alternatively, a method of allocating a planar mode or a DC mode only to any one mode of m1 and m2 and using other intra prediction mode for the remaining modes is also possible.

Alternatively, it is also possible to always use a fixed mode for m1. In an example, a fixed mode may be a planar mode or a DC mode. In this case, only an intra prediction mode used for m2 is informed by being signaled to a decoding device.

Alternatively, both m1 and m2 may be a fixed mode. In an example, two fixed modes may be a planar mode and a DC mode, respectively. Alternatively, in a directional mode, two modes with a 180-degree difference may be configured as m1 and m2, respectively.

Alternatively, a method of preconfiguring a set of modes which may be used for m1 and m2 is also possible. Table 1 is an example related to the set.

TABLE 1

| Set Index | m1 | m2 |
|---|---|---|
| 0 | Planar Mode | DC Mode |
| 1 | Planar Mode | Vertical Mode |
| 2 | DC Mode | Vertical Mode |
| 3 | Planar Mode | Horizontal Mode |
| 4 | DC Mode | Vertical Mode |
| 5 | Vertical Mode | Horizontal Mode |
| ... | ... | ... |

Afterwards, as in Table 1, a set index may be signaled to inform a decoder of an intra prediction mode used for m1 and m2. When a current block is partitioned into a plurality of partitions, a method of deriving a plurality of intra prediction modes for a current block has been described, which may be equally applied when m1 and m2 are derived and a detailed description will be omitted.

In reference to FIG. 18, a reference pixel for intra prediction of a current block may be derived S1810.

Reference pixels of a current block may be derived from a reference pixel line which is adjacent to a current block (hereinafter, referred to as an adjacent pixel line) or may be derived from a reference pixel line which is not adjacent to a current block (hereinafter, referred to as a non-adjacent pixel line). Alternatively, some of reference pixels of a current block may be derived from an adjacent pixel line and others may be derived from a non-adjacent pixel line. Here, a non-adjacent pixel line may refer to all or part of P reference pixel lines which are predefined in an encoding/decoding device.

There may be a reference pixel which is unavailable due to a reason such as encoding order of a block, a case in which a boundary of a block is positioned at a boundary of an image (e.g., a picture, a tile, a slice, a CTU raw), etc. Accordingly, at a corresponding position, a reference pixel should be generated through a padding process.

Figure 24:
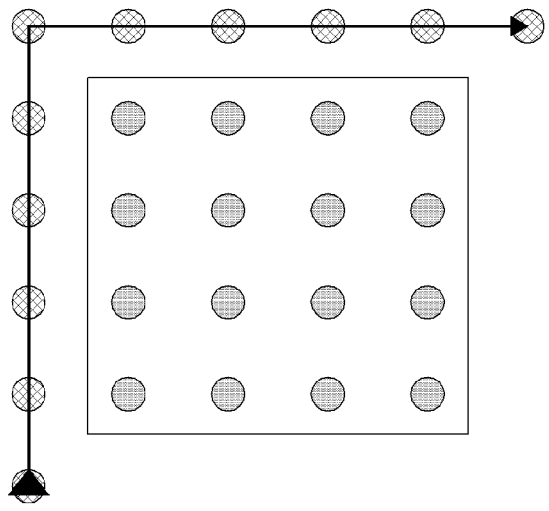
FIGS. 24 to 28 show a method of deriving a reference pixel.
Figure 24:
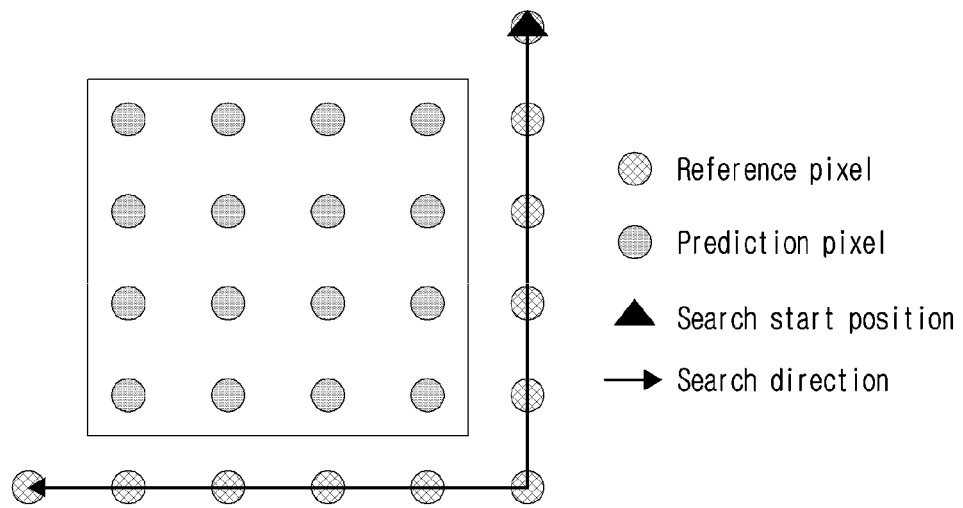

Padding may be performed by dividing a surrounding region of a current block into two regions. In an example, the left and top of a current block may be configured as a first region and the right and bottom may be configured as a second region. First, a search start position is configured per each region to determine whether a reference pixel is available. FIG. 24 is an example showing a search start position and a search direction per each region. FIG. 24(*a*) shows a first region including reference pixels on the left and top of a current block and FIG. 24(*b*) shows a second region including reference pixels on the bottom and right of a current block.

Figure 25:
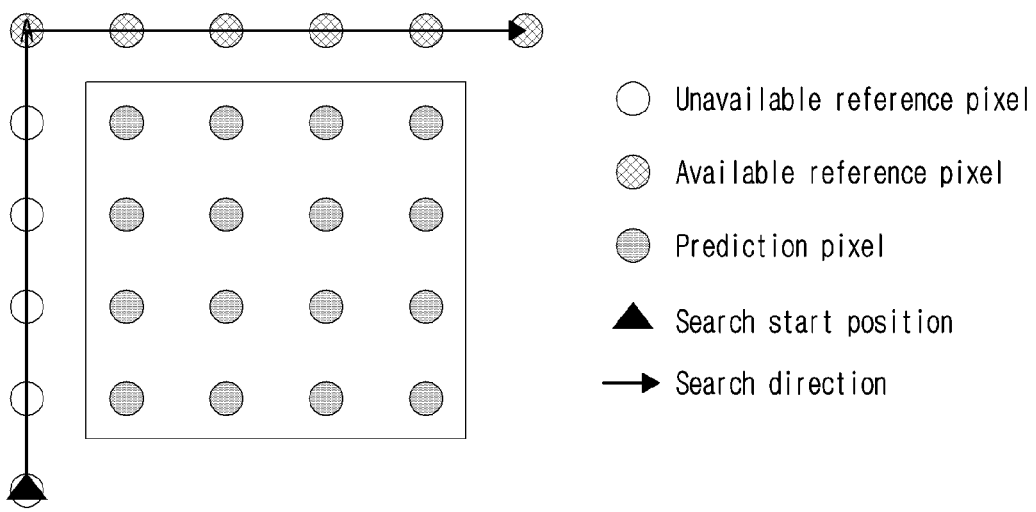

In an example, in FIG. 24(*a*), if a search start position is configured, it is checked whether there is an available reference pixel at a search start position. If it does not exist, search is performed sequentially in a search direction until an available reference pixel is searched. FIG. 25 shows an example of a search process.

In FIG. 25, it is an example in which an available reference pixel is searched first at a position of A while performing search in a search direction from a search start position. After an available reference pixel is searched at a position of A, a reference pixel at a position of A is copied to a search start position. Afterwards, padding is performed by sequentially copying a copied reference pixel to a position just before A in a search direction. In other words, when a pixel at a search start position is unavailable, an available pixel which is found first may be padded to a search start position.

Figure 26:
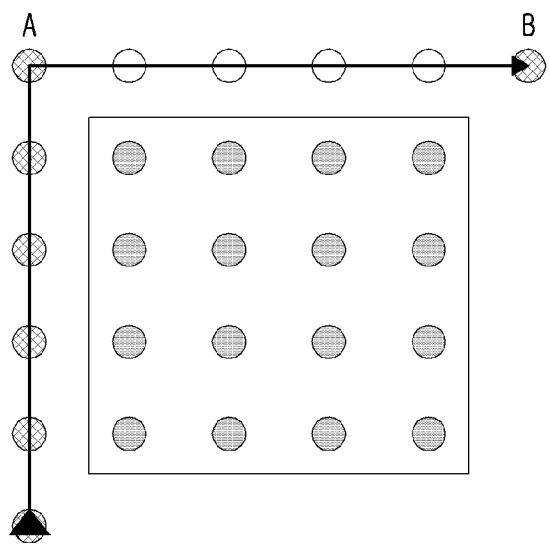
Figure 26:
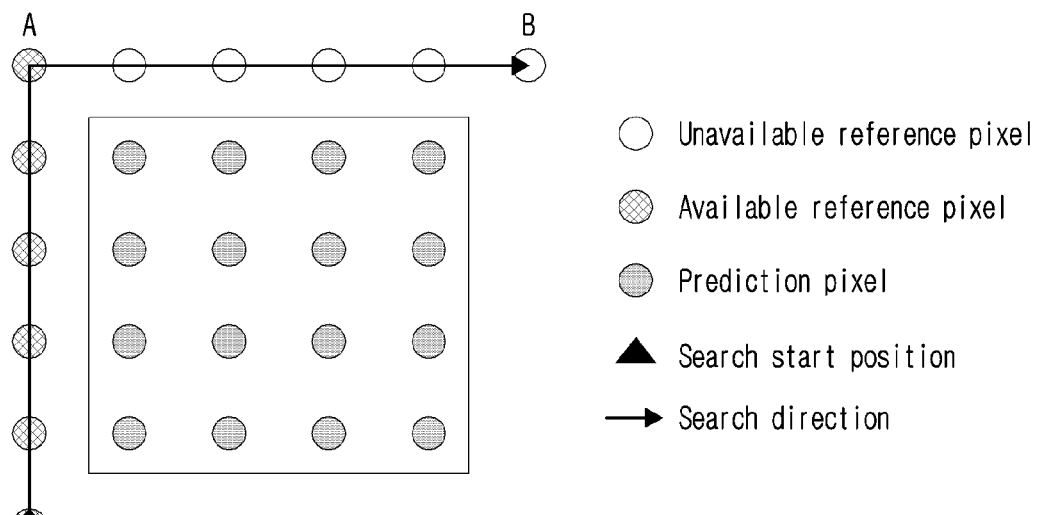

Unlike an example above, there may be a reference pixel which is unavailable after a search start position. FIG. 26 shows an example related to it.

In reference to FIG. 26(*a*), when an unavailable reference pixel exists at the middle position of a reference pixel line, interpolation is performed on a reference pixel present at a position of A and B to perform padding. In other words, when a N-th pixel is unavailable, a corresponding pixel may be generated through interpolation between an available pixel found last before N and an available pixel found first after N.

As in FIG. 26(*b*), when there is no available reference pixel from a middle point to an end point of a reference pixel line, padding is performed by sequentially copying a reference pixel existing at the nearest position A to position B. In other words, when all pixels after a N-th pixel are unavailable, padding is performed by copying a (N−1)-th pixel to a last position.

Alternatively, a method of conducting search in a search direction from a search start position, determining a first available reference pixel as a reference pixel, copying this reference pixel to all unavailable positions and performing padding is also possible.

The above-described method may be also applied in the same/similar manner to a region like FIG. 24(*b*).

When all reference pixels in a first region are unavailable, padding may be performed by using a preconfigured value. In an example, when all reference pixels are unavailable, padding may be performed on a reference pixel by using an intermediate value using a bit depth. In an example, when a bit depth of a pixel is 10 bits, a scope of a pixel value may be 0 to 1023 and an intermediate value may be 512.

Additionally, when all reference pixels in a second region are unavailable, padding may be performed on a reference pixel by using an intermediate value using a bit depth. In an example, when a bit depth of a pixel is 10 bits, a scope of a pixel value may be 0 to 1023 and an intermediate value may be 512.

A reference pixel which may be used on all four sides (left, right, top and bottom) of a current block may be generated through the above-described padding method.

Alternatively, when padding is performed in each region, a pixel in other region may be used. In an example, when padding of a second region is performed, a pixel existing in a first region may be used. Conversely, when padding of a first region is performed, a pixel existing in a second region may be also used.

Figure 27:
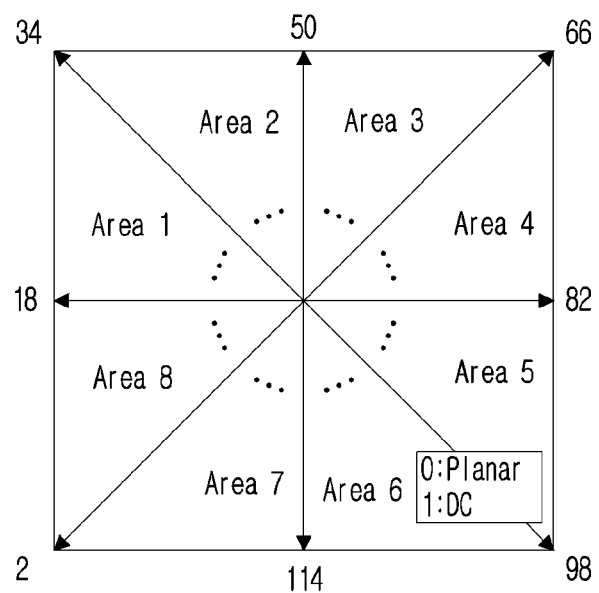

When a reference pixel exists on all four sides of a current block, a simplified reference pixel may be used depending on a directional mode. In reference to FIG. 27, according to an area to which a directional mode belongs, only one reference pixel line of a left reference pixel line, an upper reference pixel line, a right reference pixel line and a lower reference pixel line may be used. In FIG. 27, a number of an intra prediction mode is expressed as 0 to 129, and number 0 and number 1 represent a planar mode and a DC mode, respectively, and number 2 to number 129 represent a directional mode.

Figure 28:
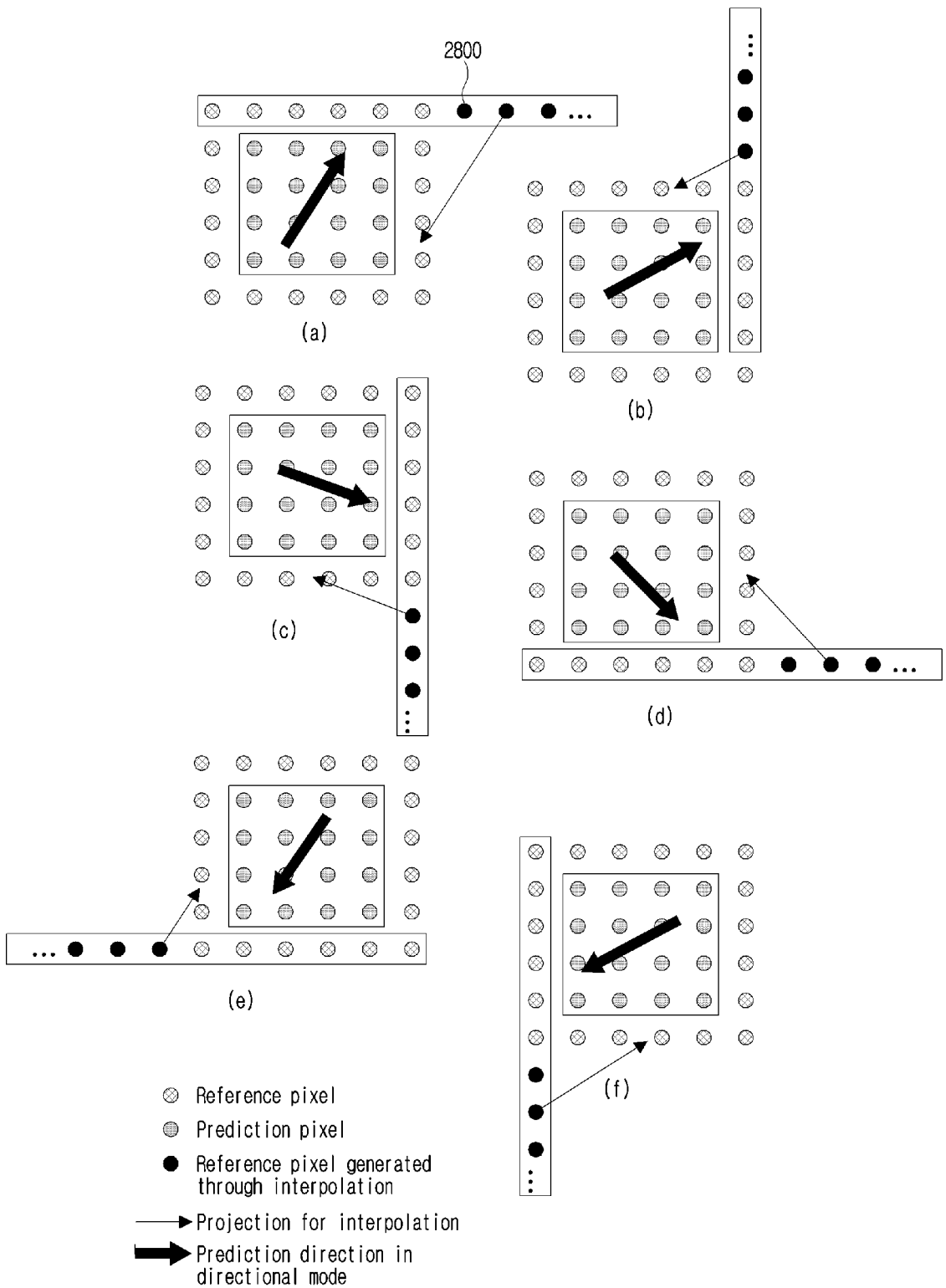

FIG. 28(*a*) to (*f*) are an example of a method of using one reference pixel line when an intra prediction mode belongs to area 3 to area 8, respectively.

As shown in FIG. 28, reference pixels may be rearranged in an one-dimensional way. A pixel 2800 may be generated by copying a pixel at a projected position in parallel with a directional mode or may be generated by interpolating surrounding integer pixels at a projected position.

When an intra prediction mode is determined at a level of a coding block, all prediction pixels in a coding block may be generated based on an intra prediction mode determined at a level of a coding block. In other words, the same intra prediction mode may be applied to all coding blocks.

Unlike an example above, intra prediction may be performed per region of a predetermined size in a coding block. To this end, an intra prediction mode may be derived in a unit of a region of a predetermined size in a coding block. Hereinafter, a method of individually configuring an intra prediction mode per region of a predetermined size in a coding block will be described in detail.

Figure 29:
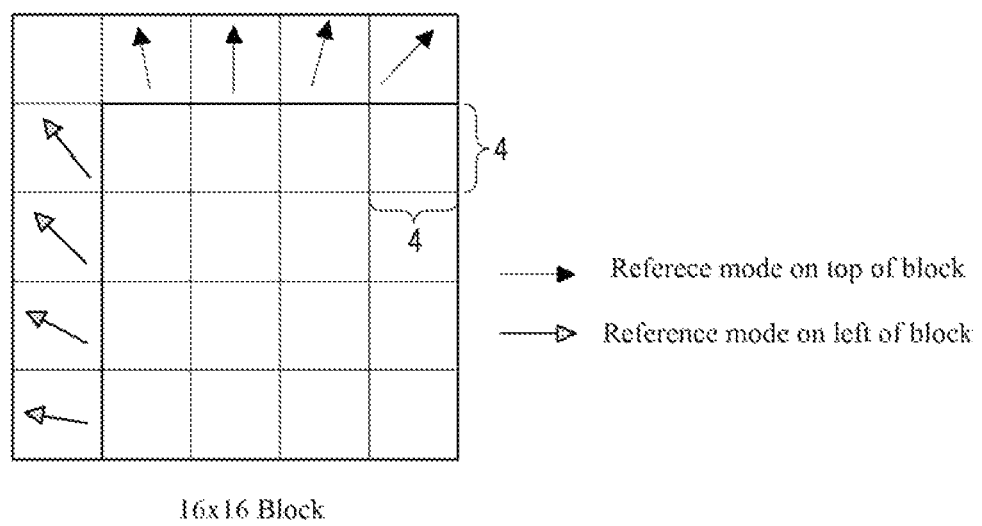
FIG. 29 is a diagram for describing an example of determining an intra prediction mode in a unit of a sub-block according to an embodiment of the present disclosure.

FIG. 29 is a diagram for describing an example of determining an intra prediction mode in a unit of a sub-block according to an embodiment of the present disclosure.

A sub-block, a determination unit of an intra prediction mode, may have a square shape such as 2×2, 4×4 or 8×8. Alternatively, it is also possible to define a sub-block in a non-square shape such as 2×8 or 8×2.

Alternatively, sub-blocks may be generated by partitioning a coding block only in a horizontal direction or in a vertical direction. When a coding block is partitioned only in a horizontal direction, a width of a sub-block is the same as that of a coding block, but a height of a sub-block has a smaller value than that of a coding block. On the other hand, when a coding block is partitioned only in a vertical direction, a height of a sub-block is the same as that of a coding block, but a width of a sub-block has a smaller value than that of a coding block.

A size and/or a shape of a sub-block, a determination unit of an intra prediction mode, may have a value which is predefined in an encoder and a decoder.

Alternatively, a size and/or a shape of a sub-block may be adaptively determined based on at least one of a size of a coding block, an encoding mode of a surrounding block (e.g., whether a surrounding block is encoded by inter prediction or is encoded by intra prediction) or an intra prediction mode of a surrounding block.

For convenience of a description, in this embodiment, it is assumed that a size of a sub-block, a determination unit of an intra prediction mode, is 4×4.

In FIG. 29, an example in which a 16×16-sized coding block is partitioned into 4×4-sized sub-blocks is shown.

A reference mode may be configured for neighboring blocks around a coding block to be currently encoded/decoded ('a current block'). Here, a neighboring block may include at least one of blocks adjacent to the top boundary of a current block or blocks adjacent to the left boundary of a current block.

A reference mode may be also derived in a unit of the same size as a sub-block. In an example, as in an example of FIG. 29, a reference mode may be derived for each of 4×4 sub-blocks adjacent to the left and/or top boundary of a current block in a unit of a 4×4 block.

When it is assumed that a width and a height of a current block are W and H, respectively, in FIG. 29, it is illustrated that a reference mode of top neighboring blocks adjacent to the top boundary from (0,0) to (W−1,0) and/or left neighboring blocks adjacent to the left boundary from (0,0) to (0,H−1) is used.

Unlike a shown example, a reference mode of top neighboring blocks adjacent to the top boundary from (0,0) to (2W−1,0) and left neighboring blocks adjacent to the left boundary from (0,0) to (0,2H−1) may be used.

An intra prediction mode used to encode/decode a block adjacent to a current block may be configured as a reference mode of a corresponding sub-block. If a block adjacent to a current block is not encoded/decoded by intra prediction, a reference mode of a corresponding block may be derived by referring to an intra prediction mode of a block adjacent to a corresponding block.

Figure 30:
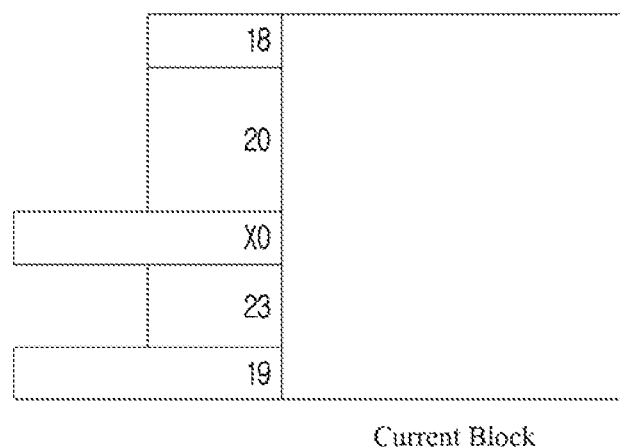
FIGS. 30 and 31 are a diagram illustrating a method of deriving a reference mode of each neighboring block adjacent to a current block.
Figure 31:
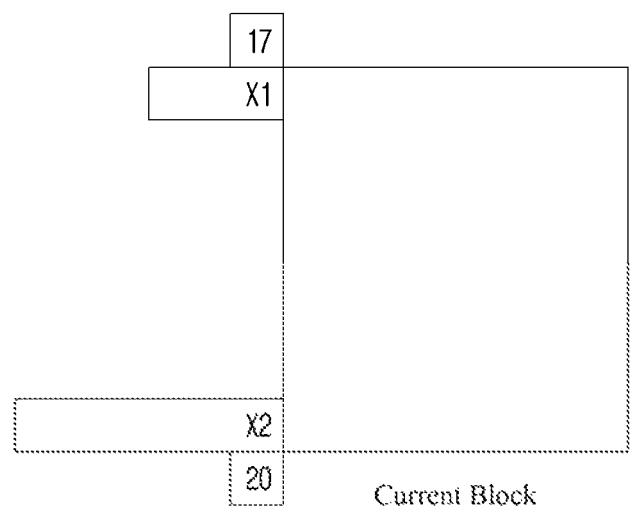

FIGS. 30 and 31 are a diagram illustrating a method of deriving a reference mode of each neighboring block adjacent to a current block.

In FIGS. 30 and 31, only left neighboring blocks are shown, but this embodiment may be also applied to deriving a reference mode of top neighboring blocks.

In FIGS. 30 and 31, a number written on neighboring blocks shows an intra prediction mode used to encode/decode a neighboring block. On the other hand, when XN (N is an integer) is written, it means that a corresponding neighboring block is not encoded/decoded by intra prediction. When a neighboring block is not encoded/decoded by intra prediction, a corresponding neighboring block may be determined to be unavailable and when a neighboring block is encoded/decoded by intra prediction, a corresponding neighboring block may be determined to be available.

When an unavailable neighboring block exists, an intra prediction mode of an unavailable neighboring block may be configured to be the same as an intra prediction mode of an adjacent block.

In an example, when scan order between neighboring blocks is predefined, among blocks whose scan order is smaller than that of an unavailable neighboring block in the scan order, an intra prediction mode of an available neighboring block with the smallest difference in scan order from the unavailable neighboring block may be configured as an intra prediction mode of an unavailable neighboring block.

In an example, when scan order between left neighboring blocks is configured from bottom to top, an intra prediction mode of an unavailable neighboring block in FIG. 30 may be configured as intra prediction mode 23 of a block adjacent to the bottom of an unavailable neighboring block.

On the other hand, when scan order between left neighboring blocks is configured from top to bottom, an intra prediction mode of an unavailable neighboring block in FIG. 30 may be configured as intra prediction mode 20 of a block adjacent to the top of an unavailable neighboring block.

When a first block in scan order, e.g., a neighboring block at the bottommost position or a neighboring block at the uppermost position among left neighboring blocks, is unavailable, an intra prediction mode of an unavailable neighboring block may be configured as an intra prediction mode of a neighboring block adjacent to the bottom or top of a corresponding neighboring block.

In an example, in an example shown in FIG. 31, when the uppermost block X1 among left neighboring blocks is unavailable, intra prediction mode 17 of a neighboring block adjacent to the top of the uppermost block X1 may be configured as an intra prediction mode of the uppermost block X1.

Alternatively, when the bottommost block X2 among left neighboring blocks is unavailable, intra prediction mode 20 of a neighboring block adjacent to the bottom of the bottommost block X2 may be configured as an intra prediction mode of the bottommost block X2.

As another example, an intra prediction mode of an unavailable neighboring block may be configured as an average value, the minimum value or the maximum value of intra prediction modes of blocks adjacent to both sides of an unavailable neighboring block. In an example, an intra prediction mode of unavailable neighboring block X0 in FIG. 30 may be configured as an average value, the minimum value or the maximum value between intra prediction mode 20 of a block adjacent to the top of an unavailable neighboring block and intra prediction mode 23 of a block adjacent to the bottom of an unavailable neighboring block.

When a plurality of consecutive neighboring blocks are unavailable, an intra prediction mode of each of a plurality of unavailable neighboring blocks may be derived by performing a weighted sum for intra prediction modes of blocks adjacent to both sides of a plurality of consecutive neighboring blocks.

In an example, in an example shown in FIG. 31, when blocks between neighboring block X1 and neighboring block X2 are all unavailable, an intra prediction mode of each left sub-block from neighboring block X1 to neighboring block X2 may be derived by performing a weighted sum for intra prediction mode 17 of a block adjacent to the top of neighboring block X1 and intra prediction mode 20 of a block adjacent to the bottom of neighboring block X2.

Alternatively, when a plurality of consecutive neighboring blocks are unavailable, an intra prediction mode of an available neighboring block selected according to scan order may be configured as an intra prediction mode of all of a plurality of consecutive neighboring blocks.

Furthermore, a non-directional intra prediction mode, e.g., a DC mode and/or a planner mode, may be configured to be unavailable as a reference mode. In other words, when an intra prediction mode of a neighboring block is a non-directional intra prediction mode, a corresponding neighboring block may be determined to be unavailable. In this case, according to an embodiment described through FIGS. 30 and 31, an intra prediction mode of an unavailable neighboring block may be newly derived.

Intra prediction modes of sub-blocks may be also derived after configuring a non-directional intra prediction mode as a reference mode.

Based on reference modes around a current block, an intra prediction mode may be derived in a unit of a sub-block in a current block. Specifically, a reference mode of an adjacent block may be configured as an intra prediction mode of sub-blocks belonging to the same column or the same row as the adjacent block.

Figure 32:
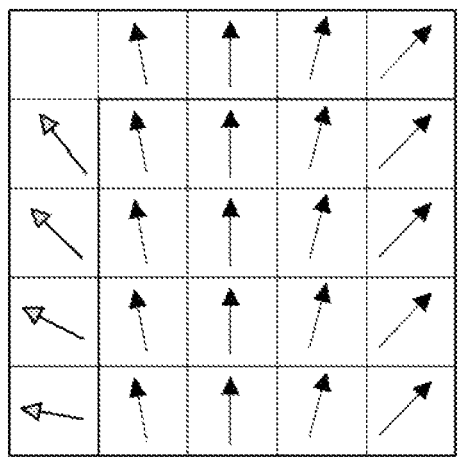
FIGS. 32 and 33 show an example of configuring an intra prediction mode of sub-blocks based on a reference mode.
Figure 33:
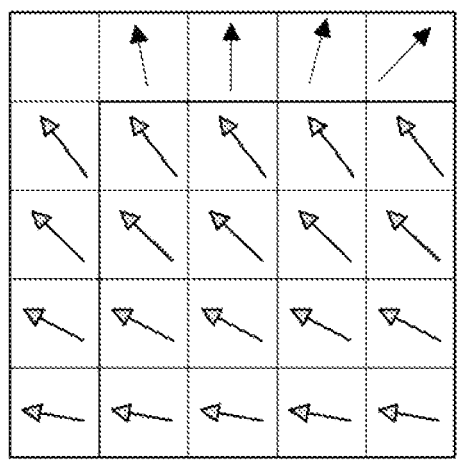

FIGS. 32 and 33 show an example of configuring an intra prediction mode of sub-blocks based on a reference mode.

FIG. 32 shows an example in which a reference mode of a top neighboring block is configured as an intra prediction mode of sub-blocks belonging to the same column as the top neighboring block. In this case, an intra prediction mode of sub-blocks belonging to the same column has the same value.

FIG. 33 shows an example in which a reference mode of a left neighboring block is configured as an intra prediction mode of sub-blocks belonging to the same row as the left neighboring block. In this case, an intra prediction mode of sub-blocks belonging to the same row has the same value.

As another example, an intra prediction mode of a sub-block may be derived by performing a weighted sum for a reference mode of a top neighboring block belonging to the same column as a sub-block and a reference mode of a left neighboring block belonging to the same row as a sub-block.

Figure 34:
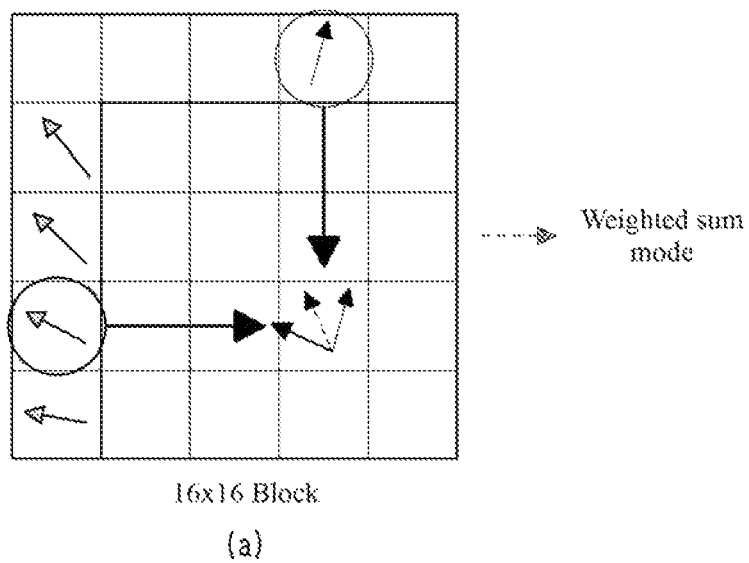
FIGS. 34 and 35 show an example of deriving an intra prediction mode of a sub-block by performing a weighted sum on reference modes.
Figure 34:
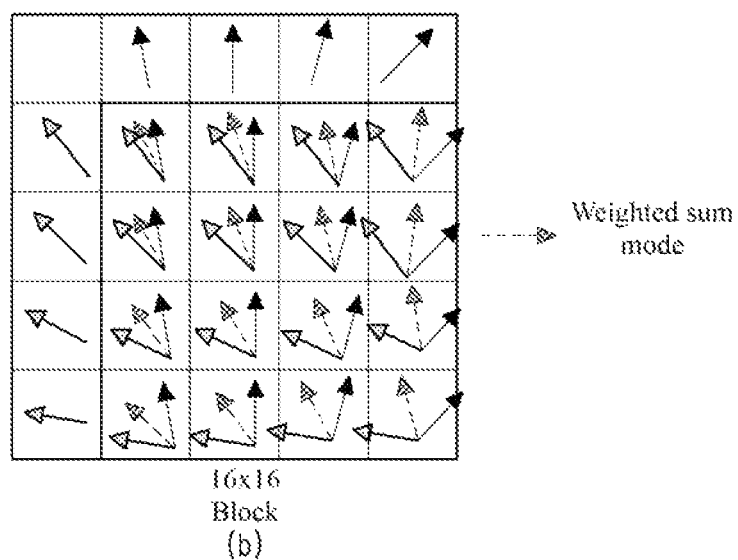
Figure 35:
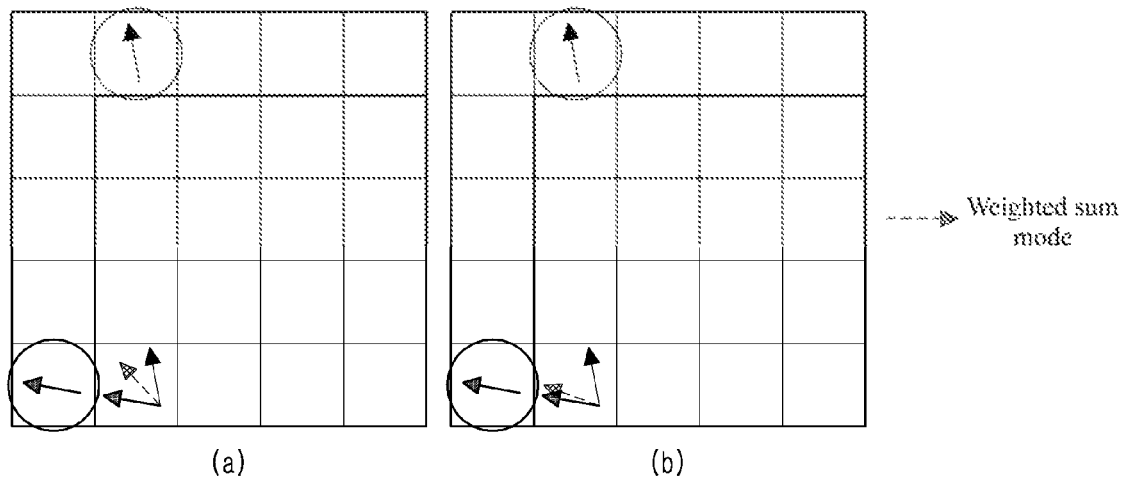

FIGS. 34 and 35 show an example of deriving an intra prediction mode of a sub-block by performing a weighted sum on reference modes.

As in an example shown in FIG. 34(a), a weighted sum mode derived by performing a weighted sum for a reference mode of a top neighboring block and a reference mode of a left neighboring block may be configured as an intra prediction mode of a sub-block. When it is assumed that the same weight is applied to a reference mode of a top neighboring block and a reference mode of a left neighboring block, an average value between two reference modes may be configured as an intra prediction mode of a sub-block. In an example, when a reference mode of a top neighboring block is number 50 and a reference mode of a left neighboring block is number 18, number 34, an average of two reference modes, may be configured as an intra prediction mode of a sub-block. FIG. 34(b) shows an example in which an average value between two reference modes is derived as a weighted sum mode for each of sub-blocks.

A weight allocated to a reference mode of a top neighboring block and a weight allocated to a reference mode of a left neighboring block may be adaptively determined according to a position of a sub-block. In an example, when a distance between a sub-block and a left neighboring block is x and a distance between a sub-block and a top neighboring block is y, a weight applied to a left neighboring block is configured as y/(x+y) and a weight applied to a reference mode of a top neighboring block may be configured as x/(x+y). In other words, after a distance between a sub-block and a left neighboring block is compared to a distance between a sub-block and a top neighboring block, when a sub-block is closer to a left neighboring block than a top neighboring block, a greater weight may be allocated to a reference mode of a left neighboring block and when a sub-block is closer to a top neighboring block than a left neighboring block, a greater weight may be allocated to a reference mode of a top neighboring block.

FIG. 35 compares an example in which a weighted sum mode is derived when a weight applied to a reference mode of a left neighboring block is the same as a weight applied to a reference mode of a top neighboring block (FIG. 35(a)) with an example in which a weighted sum mode is derived when a weight applied to a reference mode of a left neighboring block is configured to be greater than a weight applied to a reference mode of a top neighboring block (FIG. 35(b)) and show them.

Alternatively, a weight applied to left neighboring blocks may be determined in a unit of a sub-block column and a weight applied to top neighboring blocks may be determined in a unit of a sub-block row.

In an example, when there are N columns in a current block, a weight for a reference mode of a left neighboring block of each column may be configured as (N−n)/N. Here, n represents an index allocated to a current column. Specifically, index 0 is allocated to a column adjacent to the left boundary of a current block and an index value increases by 1 each time it moves to a right column.

In an example, when there are M columns in a current block, a weight for a reference mode of a top neighboring block of each row may be configured as (M−m)/M. Here, m represents an index allocated to a current row. Specifically, index 0 is allocated to a row adjacent to the top boundary of a current block and an index value increases by 1 each time it moves to a bottom row.

Alternatively, regardless of a position of a sub-block, a weight applied to a left neighboring block and a weight applied to a top neighboring block may be configured as the same value.

When an intra prediction mode of each sub-block is derived, intra prediction may be performed for each sub-block based on an intra prediction mode of each sub-block. In this case, intra prediction of each sub-block may be performed based on reference pixels derived based on a current block.

When an intra prediction mode is derived for each sub-block, an intra prediction mode of each sub-block may be stored. In this case, at least one of sub-blocks may be utilized as a MPM candidate of a block to be encoded/decoded later. In an example, if a method of deriving an intra prediction mode in a unit of a sub-block is applied to a neighboring block at a top position of a predetermined coding block, at least one of intra prediction modes of sub-blocks at a top position of a predetermined coding block may be utilized as a MPM candidate of a predetermined coding block.

Instead of storing an intra prediction mode of each sub-block, a sub-block at a specific position in a current block may be designated as a representative block and only an intra prediction mode of a representative block may be stored. In this case, only an intra prediction mode of a representative block among a plurality of sub-blocks may be used as a MPM candidate of a block to be encoded/decoded later.

A sub-block including a pixel at a reference position in a current block may be configured as a representative block. Here, a pixel at a reference position may be a pixel at a central position, a pixel at a top-left position, a pixel at a bottom-left position, a pixel at a top-right position or a pixel at a bottom-right position.

Figure 36:
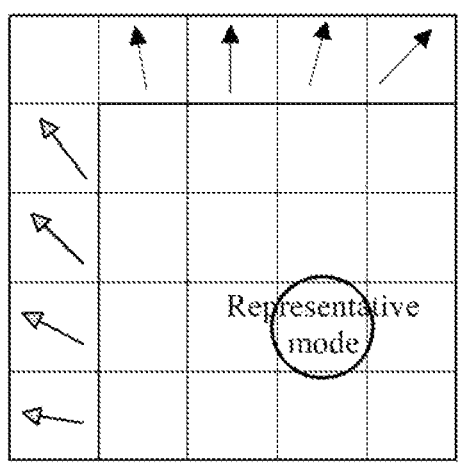
FIG. 36 shows an example in which a sub-block including a pixel at a central position of a current block is designated as a representative block.

FIG. 36 shows an example in which a sub-block including a pixel at a central position of a current block is designated as a representative block.

As in an example shown in FIG. 36, when a sub-block including a pixel at a central position is designated as a representative block, an intra prediction mode of a corresponding sub-block may be stored as an intra prediction mode of a current block.

As another example, when a method of deriving an intra prediction mode in a unit of a sub-block is applied to a current block, a default mode may be stored as an intra prediction mode of a current block. Here, a default mode may be a DC mode, a planar mode or a directional mode in a predefined direction. A directional mode in a predefined direction may be at least one of a vertical mode, a horizontal mode or a diagonal mode.

Alternatively, one of a plurality of reference modes may be configured as a representative mode and a configured representative mode may be stored as an intra prediction mode of a current block.

In an example, one of reference modes of top sub-blocks of a current block may be configured as a representative mode. Specifically, a reference mode of a sub-block including a pixel at a position of A shown in FIGS. 22 and 23 may be configured as a representative mode.

In an example, one of reference modes of left sub-blocks of a current block may be configured as a representative mode. Specifically, a reference mode of a sub-block including a pixel at a position of L shown in FIGS. 22 and 23 may be configured as a representative mode.

In an example described above, it is illustrated that a single intra prediction mode is derived per sub-block by using reference modes around a current block.

As described above, instead of deriving a single prediction mode, after a plurality of intra predictions are performed based on a plurality of reference modes, a prediction block for a sub-block may be also acquired by using a plurality of prediction blocks generated as a result of a plurality of intra predictions.

Figure 37:
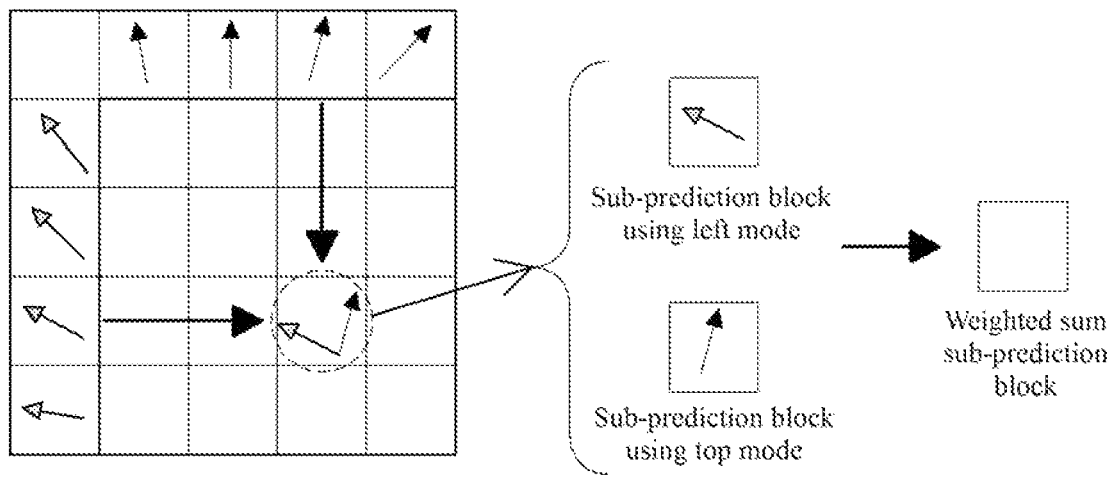
FIG. 37 is a diagram showing an example of generating a prediction block of a sub-block by performing a plurality of intra predictions.

FIG. 37 is a diagram showing an example of generating a prediction block of a sub-block by performing a plurality of intra predictions.

A first prediction block (a sub-prediction block using a left mode) may be generated by performing intra prediction based on a reference mode of a top neighboring block belonging to the same column as a sub-block. In addition, a second prediction block (a sub-prediction block using a top mode) may be generated by performing intra prediction based on a reference mode of a left neighboring block belonging to the same row as a sub-block.

Afterwards, based on a weighted sum operation of a first prediction block and a second prediction block, a prediction block of a sub-block (a weighted sum sub-prediction block) may be acquired.

In this case, a weight applied to a first prediction block and a second prediction block may be configured as the same value.

Alternatively, a weight applied to a first prediction block and a second prediction block may be configured in the same manner as previously described in an embodiment deriving a weighted sum mode. In an example, a weight applied to a first prediction block and a second prediction block may be determined by comparing a distance between a sub-block and a top neighboring block with a distance between a sub-block and a left neighboring block. In an example, when a sub-block is closer to a left neighboring block than a top neighboring block, a greater weight may be given to a second prediction block derived based on a reference mode of a left neighboring block. Conversely, when a sub-block is closer to a top neighboring block than a left neighboring block, a greater weight may be given to a first prediction block derived based on a reference mode of a top neighboring block.

Alternatively, a weight applied to a second prediction block derived based on a reference mode of a left neighboring block may be determined in a unit of a sub-block column and a weight applied to a first prediction block derived based on a reference mode of a top neighboring block may be determined in a unit of a sub-block row.

As another example, a weight may be adaptively determined according to a type of an intra prediction mode used to derive each of a first prediction block and a second prediction block. In an example, a weight allocated to a prediction block derived in a non-directional intra prediction mode may have a larger value than a weight allocated to a prediction block derived in a directional intra prediction mode.

Even when a prediction block of a sub-block is derived by performing a weighted sum for a first prediction block and a second prediction block, an intra prediction mode may be stored in the same way as when deriving a weighted sum mode.

In an example, after deriving a weighted sum mode for each of sub-blocks, a derived weighted sum mode may be stored as an intra prediction mode of a corresponding sub-block.

Alternatively, a weighted sum mode of a representative block among a plurality of sub-blocks may be stored as an intra prediction mode of a current block.

Alternatively, a default mode may be stored as an intra prediction mode of a current block.

Alternatively, a reference mode of a representative block among neighboring blocks adjacent to a current block may be stored as an intra prediction mode of a current block.

In the above-described embodiment, it was described that each of sub-blocks refers to a reference mode of a neighboring block belonging to the same row and/or column as a sub-block. Specifically, it was illustrated that an intra prediction mode of a sub-block is derived by referring to a reference mode of at least one neighboring block belonging to the same row and/or column as a sub-block or a plurality of prediction blocks for a sub-block are generated based on a reference mode of a plurality of neighboring blocks.

Unlike an example described, after determining an intra prediction mode at a level of a coding block, a position of at least one neighboring block to which each sub-block should refer may be determined based on the intra prediction mode.

In an example, when an intra prediction mode determined at a level of a coding block is a vertical directional mode, a reference mode of a top neighboring block belonging to the same column as a sub-block may be configured as an intra prediction mode of a sub-block.

In an example, when an intra prediction mode determined at a level of a coding block is in a top-left diagonal direction, a reference mode of a neighboring block positioned in a top-left diagonal direction of a sub-block may be configured as an intra prediction mode of a sub-block.

Information representing whether a method of performing intra prediction in a unit of a sub-block is applied may be explicitly signaled through a bitstream. In an example, the information may be a 1-bit flag. When the flag represents that a method of performing intra prediction in a unit of a sub-block is applied, intra prediction may be performed individually for each of sub-blocks based on reference modes around a current block. On the other hand, when the flag represents that a method of performing intra prediction in a unit of a sub-block is not applied, intra prediction may be performed by applying a single intra prediction mode to a current block.

When a method of performing intra prediction in a unit of a sub-block described above is applied, whether to configure each of sub-blocks as a transform unit may be additionally determined. Here, a transform unit represents a unit for performing at least one of quantization or transform.

Figure 38:
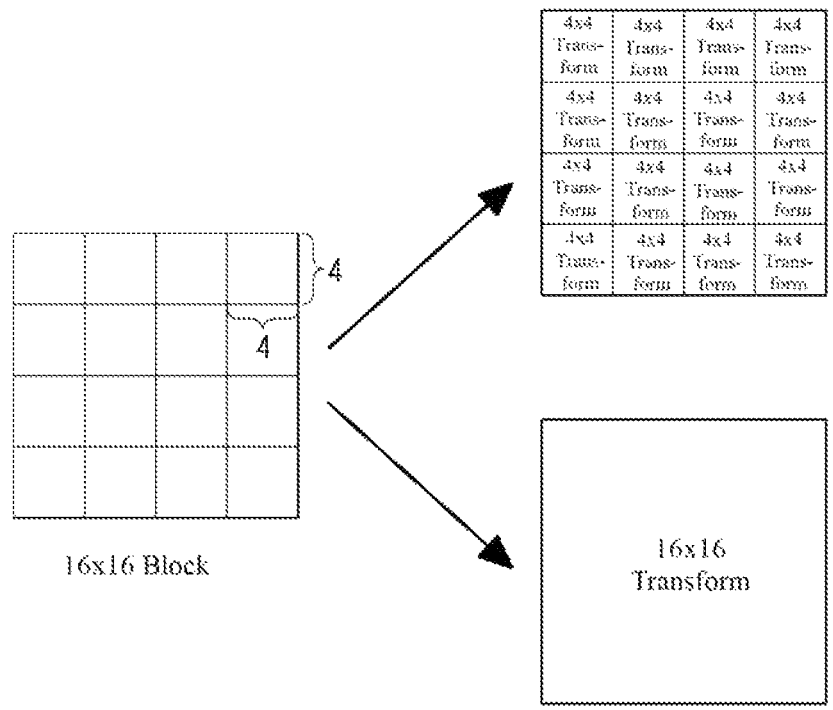
FIG. 38 is a diagram showing an encoding/decoding aspect according to whether a sub-block is configured as a transform unit.

FIG. 38 is a diagram showing an encoding/decoding aspect according to whether a sub-block is configured as a transform unit.

When it is determined to configure each of sub-blocks as a transform unit, transform/inverse transform may be performed in a unit of a sub-block. In other words, an intra prediction unit and a transform unit for transform/inverse transform may be configured to be the same.

When a sub-block is not configured as a transform unit, a transform unit may be configured in a unit of a block larger than a sub-block. In an example shown in FIG. 39, it was illustrated that a 16×16-sized coding block is configured as a transform unit. Unlike a shown example, a transform unit may be also configured in a unit of a 16×8, 8×16 or 8×8 size. In this case, an intra prediction unit and a transform unit are configured differently.

When a method of performing intra prediction in a unit of a sub-block is applied, information for determining a size of a transform unit may be additionally encoded/decoded. In an example, the information may be a 1-bit flag representing whether each of sub-blocks is used as a transform unit. When the flag represents that a sub-block is not used as a transform unit, information representing a size of a transform unit may be additionally encoded/decoded.

Alternatively, the information may be information representing a size of a transform unit. The information may indicate at least one of 4×4, 8×8 or the entire block.

As another example, when a method of performing intra prediction in a unit of a sub-block is applied, a sub-block may be configured as a transform unit by default. In other words, when a method of performing intra prediction in a unit of a sub-block is applied, transform/inverse transform may be always performed in a unit of a sub-block.

When each of sub-blocks is configured as a transform unit, at least one of a transform kernel of a sub-block or whether transform of a sub-block is skipped may be determined based on an intra prediction mode of each of sub-blocks. Here, a transform kernel may include at least one of a DCT-based kernel (e.g., DCT2, DCT8, etc.) and/or a DST-based kernel (e.g., DST7).

FIG. 39 shows an example in which whether to skip transform and a transform kernel are determined per sub-block.

As another example, when a method of performing intra prediction in a unit of a sub-block is applied, a default transform kernel may be configured to be used in all regions within a current block. Here, a default transform kernel may be one of DCT2, DCT8 or DST7.

When embodiments described based on a decoding process or an encoding process are applied to an encoding process or a decoding process, it is included in a scope of the present disclosure. When embodiments described in predetermined order are changed in order different from a description, it is also included in a scope of the present disclosure.

The above-described disclosure is described based on a series of steps or flow charts, but it does not limit a time series order of the present disclosure and if necessary, it may be performed at the same time or in different order. In addition, each component (e.g., a unit, a module, etc.) configuring a block diagram in the above-described disclosure may be implemented as a hardware device or software and a plurality of components may be combined and implemented as one hardware device or software. The above-described disclosure may be recorded in a computer readable recoding medium by being implemented in a form of a program instruction which may be performed by a variety of computer components. The computer readable recoding medium may include a program instruction, a data file, a data structure, etc. solely or in combination. A hardware device which is specially configured to store and perform magnetic media such as a hard disk, a floppy disk and a magnetic tape, optical recording media such as CD-ROM, DVD, magneto-optical media such as a floptical disk and a program instruction such as ROM, RAM, a flash memory, etc. is included in a computer readable recoding medium. The hardware device may be configured to operate as one or more software modules in order to perform processing according to the present disclosure and vice versa.

INDUSTRIAL AVAILABILITY

The present disclosure may be applied to a computing or electronic device which may encode/decode a video signal.

The invention claimed is:

1. A method of decoding an image, comprising:
deriving reference modes from neighboring region adjacent to a current prediction target block; and
obtaining a prediction block of the current prediction target block,
wherein obtaining the prediction block of the current prediction target block comprises:
generating a first prediction block for the current prediction target block by performing first intra prediction based on a first intra prediction mode selected from the reference modes;
generating a second prediction block for the current prediction target block by performing second intra prediction based on a second intra prediction mode selected from the reference modes; and
obtaining the prediction block based on the first prediction block and the second prediction block.

2. The method of claim 1, wherein the current prediction target block is included in a coding block, and
wherein the current prediction target block having a size equal to or smaller than the coding block.

3. The method of claim 1, wherein the reference region comprises a plurality of neighboring blocks, and
wherein a reference mode is derived based on an intra prediction mode of a neighboring block in the reference region, and
wherein when the neighboring block is not encoded by intra prediction, the reference mode is derived based on the intra prediction mode of at least one block adjacent to the neighboring block.

4. The method of claim 3, wherein when the neighboring block is not encoded by intra prediction, an average value, a minimum value or a maximum value of intra prediction modes of blocks positioned on both sides of the neighboring block is configured as the reference mode.

5. The method of claim 1, wherein the prediction block is obtained based on a weighted sum of the first prediction block and the second prediction block.

6. The method of claim 1, wherein the current prediction target block is a transform unit for performing an inverse transform.

7. The method of claim 6, wherein a transform kernel for performing the inverse transform on the current prediction target block is determined based on an intra prediction mode of the current prediction target block, and
wherein the intra prediction mode of the current prediction target block represents either the one of reference modes for the left neighboring region or the one of reference modes for the top neighboring region.

8. A method of encoding an image, comprising:
deriving reference modes from neighboring region adjacent to a current prediction target block; and
obtaining a prediction block of the current prediction target block,
obtaining a prediction block of the current prediction target block,
wherein obtaining the prediction block of the current prediction target block comprises:
generating a first prediction block for the current prediction target block by performing first intra prediction based on a first intra prediction mode selected from the reference modes;
generating a second prediction block for the current prediction target block by performing second intra prediction based on a second intra prediction mode selected from the reference modes; and
obtaining the prediction block based on the first prediction block and the second prediction block.

9. A device for transmitting compressed video data, comprising:
a processor configured to obtain the compressed video data; and a transmitter configured to transmit the compressed video data, wherein obtaining the compressed video data comprises:

deriving reference modes from neighboring region adjacent to a current prediction target block; and obtaining a prediction block of the current prediction target block, obtaining a prediction block of the current prediction target block, wherein obtaining the prediction block of the current prediction target block comprises:

generating a first prediction block for the current prediction target block by performing first intra prediction based on a first intra prediction mode selected from the reference modes;

generating a second prediction block for the current prediction target block by performing second intra prediction based on a second intra prediction mode selected from the reference modes; and obtaining the prediction block based on the first prediction block and the second prediction block.

\* \* \* \* \*